US012525310B2

(12) United States Patent
Yamasawa et al.

(10) Patent No.: US 12,525,310 B2
(45) Date of Patent: Jan. 13, 2026

(54) SEMICONDUCTOR DEVICE AND SEMICONDUCTOR STORAGE DEVICE CONFIGURED FOR OPERATION IN A NORMAL MODE AND TWO TEST MODES

(71) Applicant: Kioxia Corporation, Tokyo (JP)

(72) Inventors: Kiyoe Yamasawa, Kawasaki Kanagawa (JP); Yasuyuki Matsuda, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 122 days.

(21) Appl. No.: 18/460,486

(22) Filed: Sep. 1, 2023

(65) Prior Publication Data

US 2024/0105275 A1     Mar. 28, 2024

(30) Foreign Application Priority Data

Sep. 28, 2022   (JP) .................................. 2022-154981

(51) Int. Cl.
*G11C 29/00*     (2006.01)
*G11C 29/12*     (2006.01)
*G11C 16/04*     (2006.01)
*H10B 80/00*     (2023.01)

(52) U.S. Cl.
CPC .... *G11C 29/12015* (2013.01); *G11C 16/0483* (2013.01); *H10B 80/00* (2023.02)

(58) Field of Classification Search
CPC .......... G11C 29/12015; G11C 16/0483; G11C 2029/3202; G11C 29/32; H10B 80/00; H10B 43/27; H10B 43/40

USPC ......................................................... 365/200
See application file for complete search history.

(56) References Cited

U.S. PATENT DOCUMENTS

| 4,697,279 A | * | 9/1987 | Baratti ........... G01R 31/318541 |
| | | | 377/77 |
| 5,198,999 A | * | 3/1993 | Abe ..................... G11C 7/1006 |
| | | | 377/67 |
| 5,526,316 A | * | 6/1996 | Lin ......................... G11C 8/04 |
| | | | 365/230.01 |
| 2017/0236595 A1 | | 8/2017 | Maejima et al. | |

FOREIGN PATENT DOCUMENTS

JP          2017142874 A      8/2017

* cited by examiner

*Primary Examiner* — Tha-O H Bui
(74) *Attorney, Agent, or Firm* — Kim & Stewart LLP

(57) ABSTRACT

A latch group includes a first latch circuit, a second latch circuit, and a third latch circuit. A clock signal of which a signal value is inverted from a clock signal of the second latch circuit is input to the first latch circuit and the third latch circuit. A control circuit is configured to operate the latch group in a normal mode, and first and second test modes. The control circuit, while operating the latch group in a first test mode, transmits a control signal to the first switch circuit to connect the electrical path between the first data output terminal and the second data input terminal, and while operating the latch group in the second test mode, transmits a control signal to the second switch circuit to connect the electrical path between the second data output terminal and the third data input terminal.

20 Claims, 20 Drawing Sheets

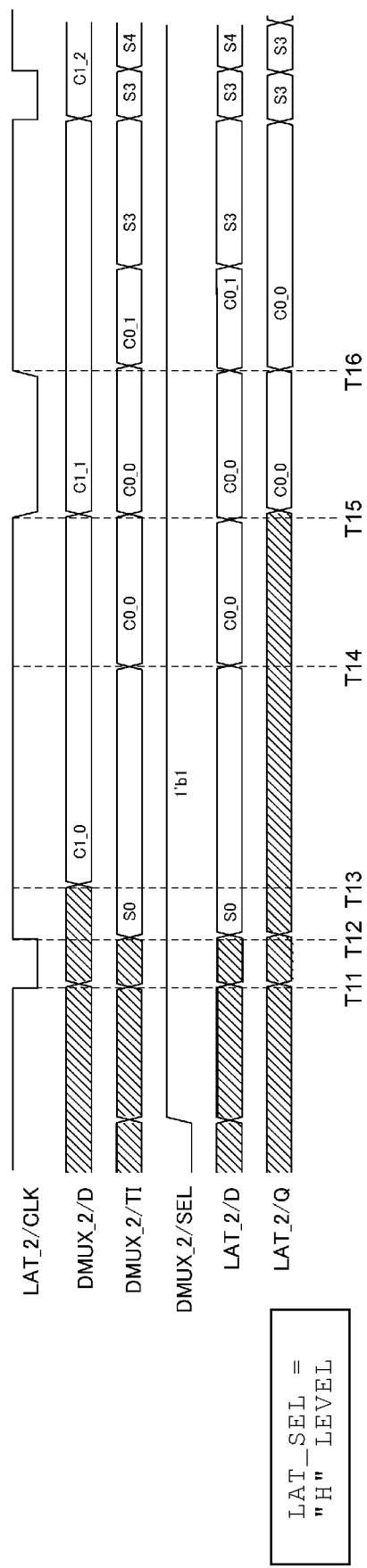

SEMICONDUCTOR DEVICE AND SEMICONDUCTOR STORAGE DEVICE CONFIGURED FOR OPERATION IN A NORMAL MODE AND TWO TEST MODES

CROSS-REFERENCE TO RELATED APPLICATION(S)

This application is based upon and claims the benefit of priority from Japanese Patent Application No. 2022-154981, filed Sep. 28, 2022, the entire contents of which are incorporated herein by reference.

FIELD

Embodiments described herein relate generally to a semiconductor device and a semiconductor storage device.

BACKGROUND

In a semiconductor storage device such as a NAND-type flash memory, many flip-flop circuits are used as a storage circuit for storing a specific value. Since a flip-flop circuit requires a large mounting area, it is considered to use a latch circuit instead of the flip-flop circuit. However, when the latch circuit is used, while the mounting area can be reduced as compared to the flip-flop circuit, there is a problem that the scan test cannot be performed. That is, there is a trade-off relationship between the reduction of the mounting area and the improvement of the fault detection rate by performing the scan test, and the achievement of both is required.

DESCRIPTION OF THE DRAWINGS

FIG. 17B is a diagram illustrating an operation of the CRD latch group when the signal LAT_SEL is in an "H" level.

DETAILED DESCRIPTION

Figure 1:
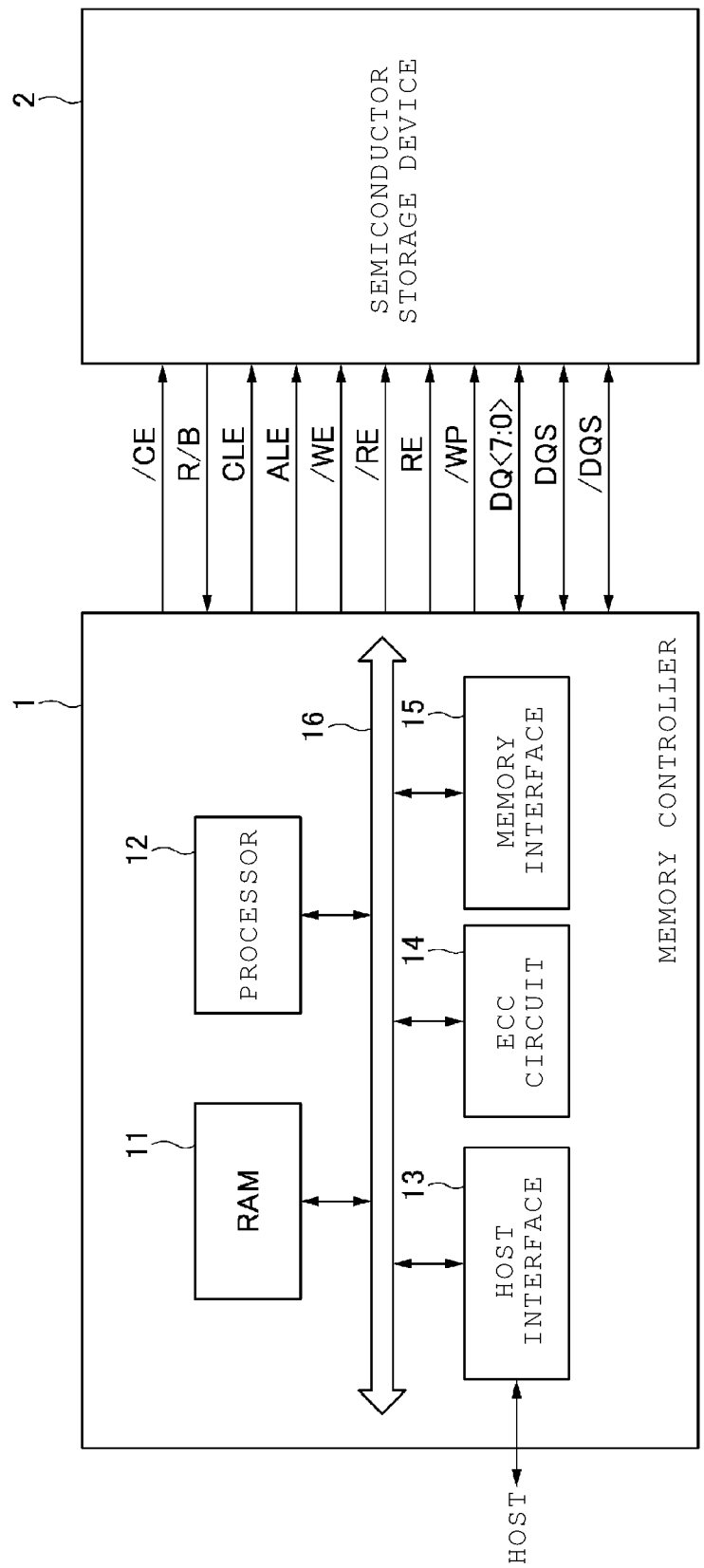
FIG. 1 is a block diagram illustrating a configuration example of a memory system that includes a semiconductor storage device according to an embodiment.

Embodiments provide a semiconductor device and a semiconductor storage device that can reduce a mounting area and improve a fault detection rate.

In general, according to one embodiment, a semiconductor device includes: a first latch circuit that includes a first clock input terminal to which a first clock signal is input during operation of the semiconductor device, a first data input terminal, and a first data output terminal; a second latch circuit that includes a second clock input terminal to which a second clock signal obtained by inverting the first clock signal is input during operation of the semiconductor device, a second data input terminal, and a second data output terminal; a third latch circuit that includes a third clock input terminal to which the first clock signal is input during operation of the semiconductor device, a third data input terminal, and a third data output terminal; a first switch circuit configured to connect or disconnect an electrical path between the first data output terminal and the second data input terminal; a second switch circuit configured to connect or disconnect an electrical path between the second data output terminal and the third data input terminal; and a control circuit configured to operate the semiconductor device in a normal mode, and first and second test modes. The control circuit, while operating the semiconductor device in the first test mode, transmits a control signal to the first switch circuit to connect the electrical path between the first data output terminal and the second data input terminal, and while operating the semiconductor device in the second test mode, transmits a control signal to the second switch circuit to connect the electrical path between the second data output terminal and the third data input terminal.

The present embodiment is described below with reference to the accompanying drawings. In order to facilitate understanding of the description, the same elements in each drawing are denoted by the same reference numerals as much as possible, and overlapping descriptions are omitted.

A semiconductor storage device 2 according to the present embodiment is a nonvolatile storage device configured as a NAND-type flash memory. In FIG. 1, a configuration example of a memory system including the semiconductor storage device 2 is illustrated as a block diagram. This memory system includes a memory controller 1 and the semiconductor storage device 2. In practice, a plurality of semiconductor storage devices 2 are provided in the memory system of FIG. 1, but only one of the semiconductor storage devices is illustrated in FIG. 1. Specific configurations of the semiconductor storage device 2 are described below. This memory system can be connected with a host (not illustrated). The host is, for example, an electronic apparatus such as a personal computer or a mobile terminal.

The memory controller 1 controls writing of data into the semiconductor storage device 2 according to the write request from the host. Further, the memory controller 1 controls the reading of data from the semiconductor storage device 2 according to the read request from the host.

Signals including a chip enable signal /CE, a ready busy signal R/B, a command latch enable signal CLE, an address latch enable signal ALE, a write enable signal /WE, read enable signals /RE and RE, a write protect signal /WP, a signal DQ<7:0> that contains data, data strobe signals DQS and /DQS are transmitted and received between the memory controller 1 and the semiconductor storage device 2.

The chip enable signal /CE is a signal for enabling the semiconductor storage device 2. The ready busy signal R/B is a signal for indicating whether the semiconductor storage device 2 is in a ready state or in a busy state. The "ready state" refers to a state in which the semiconductor storage device 2 is capable of receiving a command from the outside. The "busy state" is a state in which the semiconductor storage device 2 is not capable of receiving a command from the outside. The command latch enable signal CLE is a signal indicating that the signal DQ<7:0> contains a command. The address latch enable signal ALE is a signal indicating that the signal DQ<7:0> contains an address. The write enable signal /WE is a signal that is asserted whenever a command, an address, and data are transmitted by the memory controller 1 to the semiconductor storage device 2. The memory controller 1 instructs the semiconductor storage device 2 to receive the signal DQ<7:0> while the signal /WE is in a "low (L)" level (may be also referred to as a low level).

The read enable signal /RE is a signal used by the memory controller 1 for reading data from the semiconductor storage device 2. The signal RE is a complementary signal of the signal /RE. The signals are used for controlling an operation timing of the semiconductor storage device 2, for example, for controlling when the signal DQ<7:0> is to be output from the semiconductor storage device 2 to the memory controller 1. The write protect signal /WP is a signal for instructing the semiconductor storage device 2 to prohibit writing and erasing data. The signal DQ<7:0> contains data transmitted and received between the semiconductor storage device 2 and the memory controller 1 and includes a command, an address, and data. The data strobe signal DQS is a signal for controlling the timing of input and output of the signal DQ<7:0>. The signal /DQS is a complementary signal of the signal DQS.

The memory controller 1 includes a RAM 11, a processor 12, a host interface 13, an ECC circuit 14, and a memory interface 15. The RAM 11, the processor 12, the host interface 13, the ECC circuit 14, and the memory interface 15 are connected to each other via an internal bus 16.

The host interface 13 outputs a request, user data (write data), and the like that are received from the host to the internal bus 16. In addition, the host interface 13 transmits user data read from the semiconductor storage device 2 and a response and the like from the processor 12 to the host.

The memory interface 15 controls a process of writing user data and the like into the semiconductor storage device 2 based on the instruction of the processor 12 and a process of reading user data and the like from the semiconductor storage device 2.

The processor 12 performs the overall control of the memory controller 1. The processor 12 is, for example, a CPU or an MPU. When receiving a request from the host via the host interface 13, the processor 12 performs control according to the request. For example, the processor 12 instructs the memory interface 15 to write user data and a parity into the semiconductor storage device 2 according to the request from the host. In addition, according to the request from the host, the processor 12 instructs the memory interface 15 to read the user data and the parity from the semiconductor storage device 2.

The processor 12 determines a storage area (memory area) on the semiconductor storage device 2 with respect to user data stored in the RAM 11. The user data is stored in the RAM 11 via the internal bus 16. The processor 12 determines a memory area with respect to data having a size of a page unit that is a unit of writing (page data). User data stored in one page of the semiconductor storage device 2 is referred to as "unit data" below. The unit data is generally encoded and stored in the semiconductor storage device 2 as a codeword. According to the present embodiment, encoding is optional. The memory controller 1 may store the unit data in the semiconductor storage device 2 without encoding, but in FIG. 1, a configuration of the memory controller 1 that performs encoding is illustrated as a configuration example. When the memory controller 1 does not perform encoding, page data is identical to unit data. In addition, one codeword may be generated based on one item of unit data, and one codeword may be generated based on divided data obtained by dividing unit data. In addition, one codeword may be generated by using a plurality of items of unit data.

The processor 12 determines a memory area of the semiconductor storage device 2 as a writing destination per unit data. A physical address is assigned to a memory area of the semiconductor storage device 2. The processor 12 manages the memory area as the writing destination of the unit data by using the physical address. The processor 12 designates the determined memory area (physical address) and instructs the memory interface 15 to write the user data into the semiconductor storage device 2. The processor 12 manages correspondence between a logical address (logical address managed by the host) and the physical address of the user data. When the read request including the logical address is received from the host, the processor 12 determines the physical address corresponding to the logical address, designates the physical address, and instructs the memory interface 15 to read the user data.

The ECC circuit 14 encodes the user data stored in the RAM 11 and generates the codeword. In addition, the ECC circuit 14 decodes the codeword read from the semiconductor storage device 2. The ECC circuit 14 detects an error in the data, for example, by using checksums placed in the user data, and corrects the error.

The RAM 11 temporarily stores the user data received from the host in the semiconductor storage device 2 or temporarily stores the data read from the semiconductor storage device 2 until transmitting the data to the host. The RAM 11 is, for example, a general-purpose memory such as an SRAM or a DRAM.

In FIG. 1, a configuration example in which the memory controller 1 includes the ECC circuit 14 and the memory interface 15, separately is illustrated. Alternatively, the ECC circuit 14 may be built in the memory interface 15. In addition, the ECC circuit 14 may be built in the semiconductor storage device 2. The specific configuration or arrangement of each element illustrated in FIG. 1 is not a limiting example.

When the write request is received from the host, the memory system of FIG. 1 operates as follows. The processor 12 temporarily stores the data to be a target of the write operation in the RAM 11. The processor 12 reads data stored in the RAM 11 and inputs the data into the ECC circuit 14. The ECC circuit 14 encodes the input data and inputs the codeword into the memory interface 15. The memory interface 15 writes the input codeword into the semiconductor storage device 2.

When the read request is received from the host, the memory system of FIG. 1 operates as follows. The memory interface 15 inputs the codeword read from the semiconductor storage device 2 into the ECC circuit 14. The ECC circuit 14 decodes the input codeword and stores the decoded data in the RAM 11. The processor 12 transmits the data stored in the RAM 11 to the host via the host interface 13.

Figure 2:
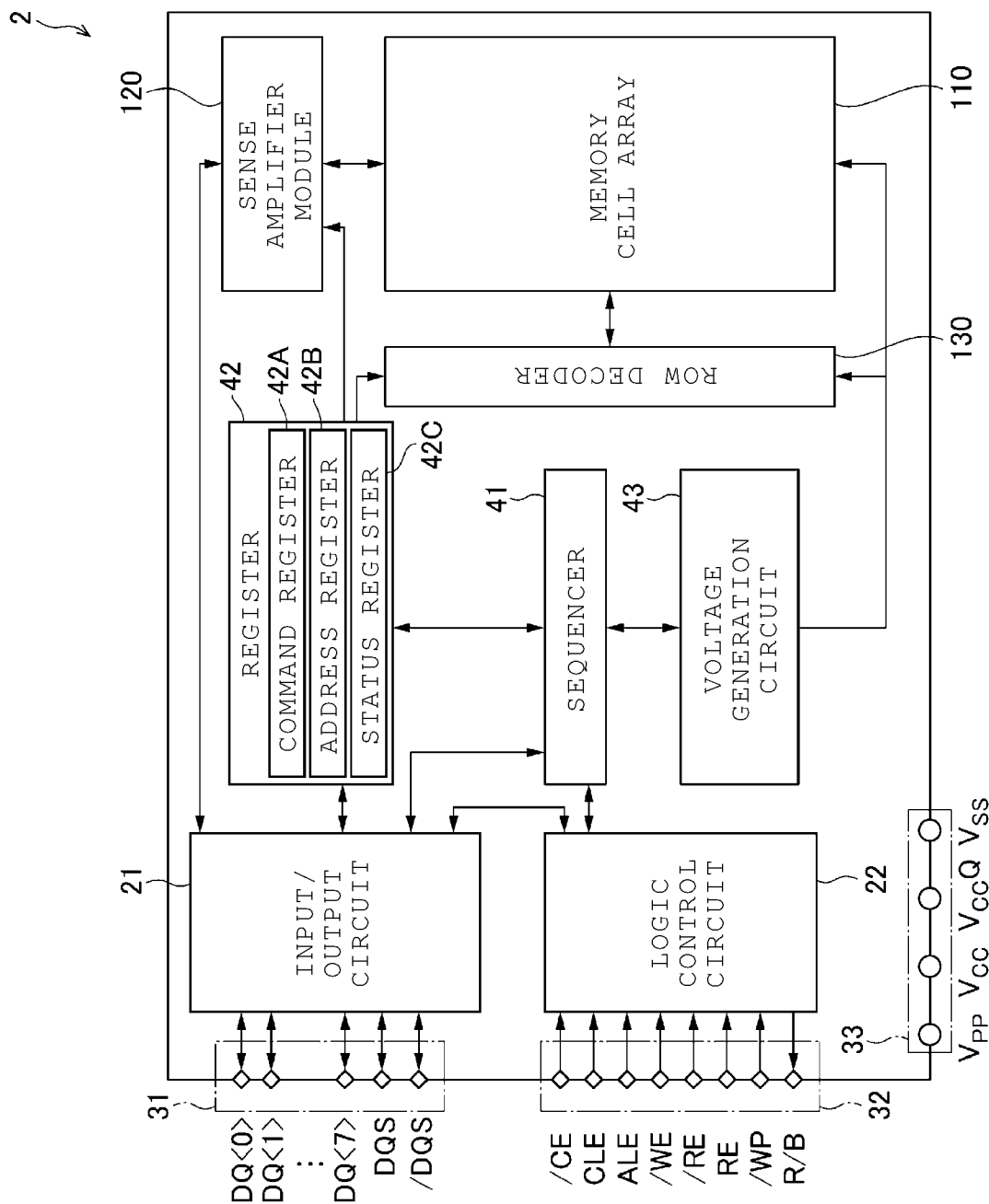
FIG. 2 is a block diagram illustrating a configuration of the semiconductor storage device according to the embodiment.

The configuration of the semiconductor storage device 2 is described. As illustrated in FIG. 2, the semiconductor storage device 2 includes a memory cell array 110, a sense amplifier module 120, a row decoder 130, an input/output circuit 21, a logic control circuit 22, a sequencer 41, a register 42, a voltage generation circuit 43, an input/output pad group 31, a logic control pad group 32, and a power input terminal group 33.

Figure 3:
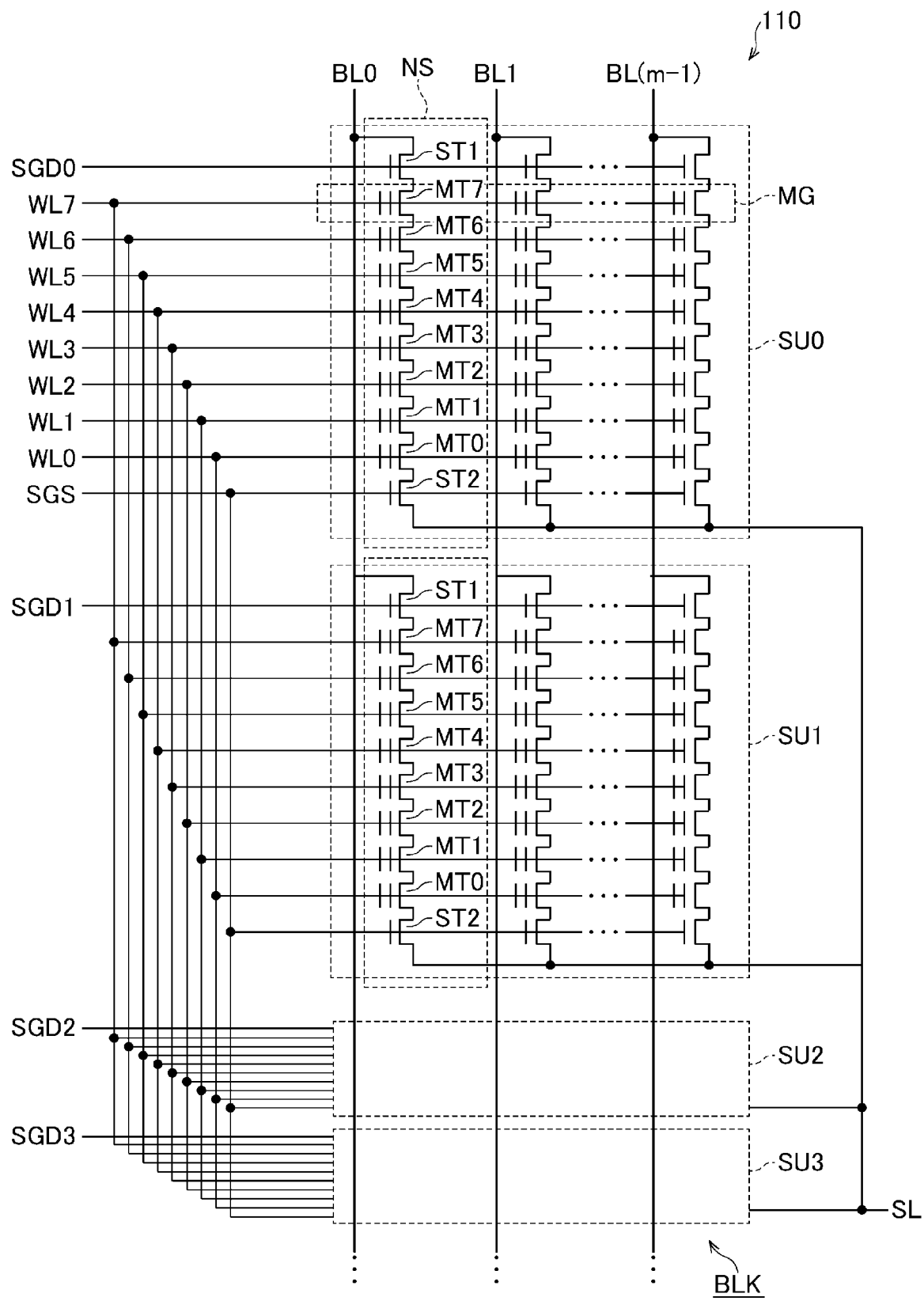
FIG. 3 is an equivalent circuit diagram illustrating a configuration of a memory cell array.

The memory cell array 110 is an element that stores data. In FIG. 3, a configuration of the memory cell array 110 is illustrated as an equivalent circuit diagram. The memory cell array 110 is configured with a plurality of blocks BLK, but only one of the blocks BLK is illustrated in FIG. 3. The configuration of the other blocks BLK provided in the memory cell array 110 may be the same as that illustrated in FIG. 3.

As illustrated in FIG. 3, the block BLK includes, for example, four string units SU (SU0 to SU3). Also, the string units SU each include a plurality of NAND strings NS. The NAND strings NS each include, for example, eight memory cell transistors MT (MT0 to MT7) and select transistors ST1 and ST2.

Further, the number of the memory cell transistors MT is not limited to eight, and may be, for example, 32, 48, 64, or 96. For example, in order to improve cutoff characteristics, the select transistors ST1 and ST2 each may be configured with a plurality of transistors, not a single transistor. In addition, dummy cell transistors may be provided between the memory cell transistors MT and the select transistors ST1 and ST2.

The memory cell transistors MT are connected in series between the select transistor ST1 and the select transistor ST2. The memory cell transistor MT7 on one end side is connected to the source of the select transistor ST1, and the memory cell transistor MT0 on the other end side is connected to the drain of the select transistor ST2.

The gates of the select transistors ST1 of the string units SU0 to SU3 are commonly connected to select gate lines SGD0 to SGD3, respectively. The gates of the select transistors ST2 are commonly connected to the same select gate line SGS across the plurality of string units SU in the same block BLK. The control gates of the memory cell transistors MT0 to MT7 in the same block BLK are commonly connected to word lines WL0 to WL7, respectively. That is, while the word lines WL0 to WL7 and the select gate line SGS are common across the plurality of string units SU0 to SU3 in the same block BLK, the select gate lines SGD are separately provided for each of the string units SU0 to SU3 even in the same block BLK.

In the memory cell array 110, m bit lines BL (BL0, BL1, . . . , and BL(m−1)) are provided. The "m" is an integer indicating the number of the NAND strings NS provided in one string unit SU. In the NAND strings NS, the drains of the select transistors ST1 are connected to the corresponding bit lines BL, respectively. The source of the select transistor ST2 is connected to a source line SL. The source line SL is commonly connected to the sources of the plurality of select transistors ST2 provided in the block BLK.

The data stored in the plurality of memory cell transistors MT in the same block BLK is collectively erased. Meanwhile, data is collectively read and written with respect to the plurality of memory cell transistors MT that are connected to one word line WL and belong to one string unit SU. Each memory cell can store 3-bit data including a high-order bit, a middle-order bit, and a low-order bit.

That is, the semiconductor storage device 2 according to the present embodiment employs a TLC method of storing 3-bit data in one memory cell transistor MT as a method of writing data into the memory cell transistor MT. Instead of such a mode, as the method of writing data into the memory cell transistor MT, a multi-level cell (MLC) method of storing 2-bit data in one memory cell transistor MT or a single-level cell (SLC) method of storing 1-bit data in one memory cell transistor MT may be employed.

Further, in the following description, a set of 1-bit data stored in the plurality of memory cell transistors MT that is connected to one word line WL and belongs to one string unit SU is referred to as a "page". In FIG. 3, one set including the plurality of memory cell transistors MT is denoted by the reference numeral "MG".

As in the present embodiment, when 3-bit data is stored in one memory cell transistor MT, a set of the plurality of memory cell transistors MT connected to the common word line WL in one string unit SU can store data of three pages.

Figure 4:
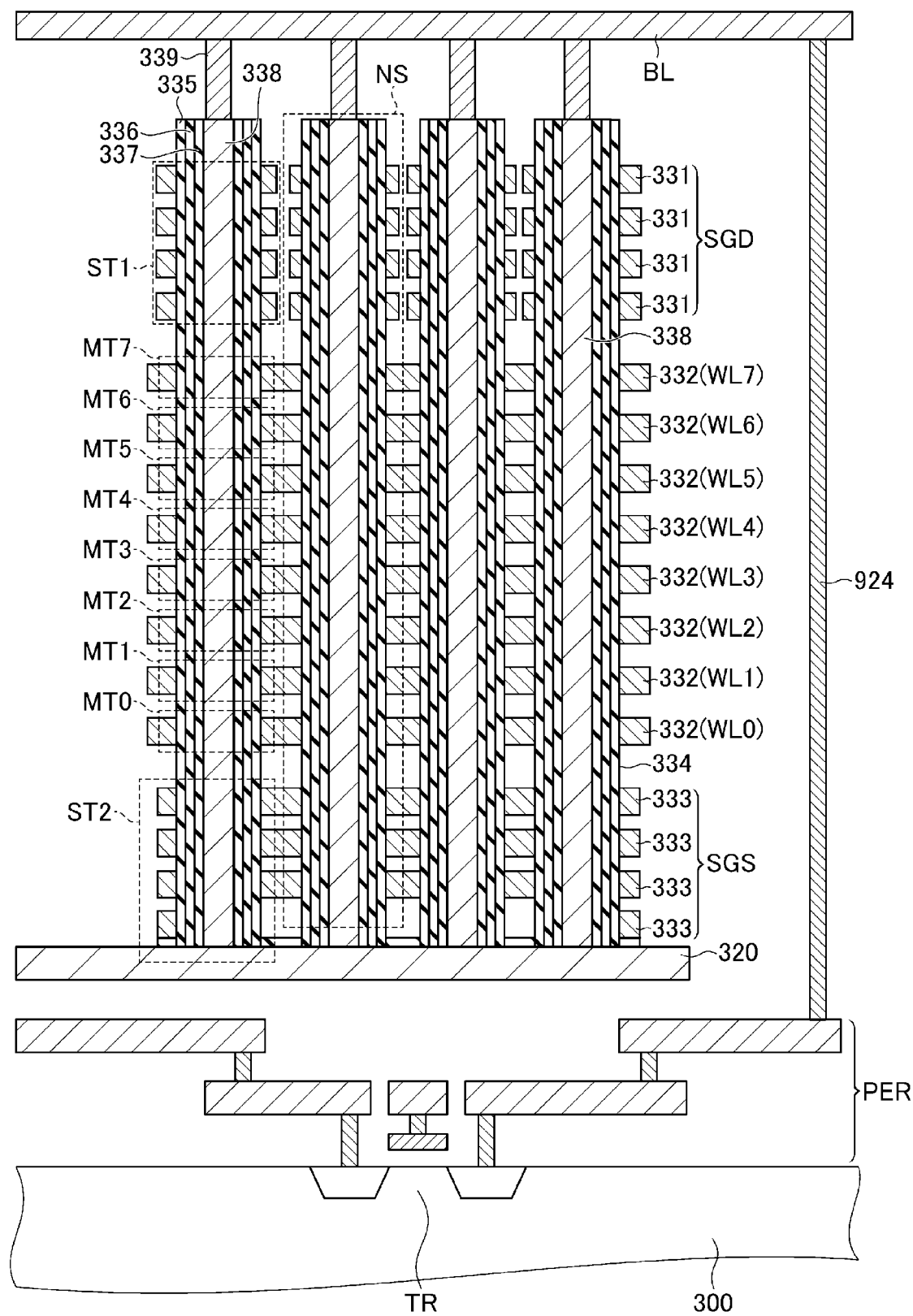
FIG. 4 is a cross-sectional view illustrating the configuration of the memory cell array.

In FIG. 4, a configuration of the memory cell array 110 is illustrated as a schematic cross-sectional view. In FIG. 4, in the memory cell array 110, the plurality of NAND strings NS are formed on a conductor layer 320. The conductor layer 320 is also referred to as an embedded source line (BSL) and corresponds to the source line SL of FIG. 3.

A plurality of wiring layers 333 that function as the select gate line SGS, a plurality of wiring layers 332 that function as the word lines WL, and a plurality of wiring layers 331 that function as the select gate line SGD are stacked on the conductor layer 320. Insulating layers (not illustrated) are located between the stacked wiring layers 333, 332, and 331.

A plurality of memory holes 334 are formed on the memory cell array 110. The memory hole 334 is a hole that penetrates the wiring layers 333, 332, and 331, with insulating layers (not illustrated) provided therebetween in the vertical direction, and reaches the conductor layer 320. A block insulating film 335, a charge storage layer 336, and a gate insulating film 337 are sequentially formed on the side surface of the memory hole 334, and further, a conductive pillar 338 is embedded inside thereof. The conductive pillar 338 includes, for example, polysilicon, and functions as an area where a channel is formed at the time of the operations of the memory cell transistors MT and the select transistors ST1 and ST2 provided in the NAND string NS. In this manner, a columnar shaped body including the block insulating film 335, the charge storage layer 336, the gate insulating film 337, and the conductive pillar 338 is formed in the memory hole 334.

Among the columnar shaped body formed in the memory hole 334, portions intersecting the stacked wiring layers 333, 332, and 331 function as transistors. Among the plurality of transistors, a transistor that is in a portion intersecting the wiring layer 331 functions as the select transistor ST1. Among the plurality of transistors, transistors that are in portions intersecting the wiring layers 332 function as the memory cell transistors MT (MT0 to MT7). Among the plurality of transistors, a transistor that is in a portion intersecting the wiring layer 333 functions as the select transistor ST2. In such a configuration, columnar shaped bodies formed in the memory holes 334 function as the NAND strings NS described with reference to FIG. 3. The conductive pillars 338 in the columnar shaped bodies are portions functioning as channels of the memory cell transistors MT or channels of the select transistors ST1 and ST2.

Wiring layers functioning as the bit lines BL are formed over the conductive pillar 338. A contact plug 339 that connects the conductive pillar 338 and the bit line BL is formed on the upper end of the conductive pillar 338.

A plurality of configurations which are the same as the configuration illustrated in FIG. 4 are located in the depth direction of the paper surface of FIG. 4. One string unit SU is formed by a set of the plurality of NAND strings NS located in a line along the depth direction of the page of FIG. 4.

In the semiconductor storage device 2 according to the present embodiment, a peripheral circuit PER is under the memory cell array 110, that is, at a position between the memory cell array 110 and a semiconductor substrate 300. The peripheral circuit PER is a circuit provided for carrying out a write operation or a read operation, an erasing operation, and the like of data in the memory cell array 110. The sense amplifier module 120, the row decoder 130, the voltage generation circuit 43, and the like illustrated in FIG. 2 are a part of the peripheral circuit PER. The peripheral circuit PER includes various transistors, RC circuits, and the like. In the example illustrated in FIG. 4, a transistor TR formed on the semiconductor substrate 300 and the bit line BL over the memory cell array 110 are electrically connected to each other via a contact 924. Also, the peripheral circuit PER and the memory cell array 110 may be provided on a separate chip. That is, the peripheral circuit PER is provided on a first chip, and the memory cell array 110 may be provided on a second chip bonded to the first chip.

Further, instead of such a configuration, the memory cell array 110 may be provided directly on the semiconductor substrate 300. In this case, a p-type well region of the semiconductor substrate 300 functions as the source line SL. In addition, the peripheral circuit PER is provided at a position adjacent to the memory cell array 110 along the upper surface of the semiconductor substrate 300.

Referring back to FIG. 2, the sense amplifier module 120 is a circuit that adjusts the voltage applied to the bit line BL, reads the voltage of the bit line BL, and converts the voltage to data. At the time of reading the data, the sense amplifier module 120 acquires read data read from the memory cell transistor MT to the bit line BL and transmits the acquired read data to the input/output circuit 21. At the time of writing data, the sense amplifier module 120 transmits the write data written via the bit line BL to the memory cell transistor MT. The operation of the sense amplifier module 120 is controlled by the sequencer 41 described below.

Figure 5:
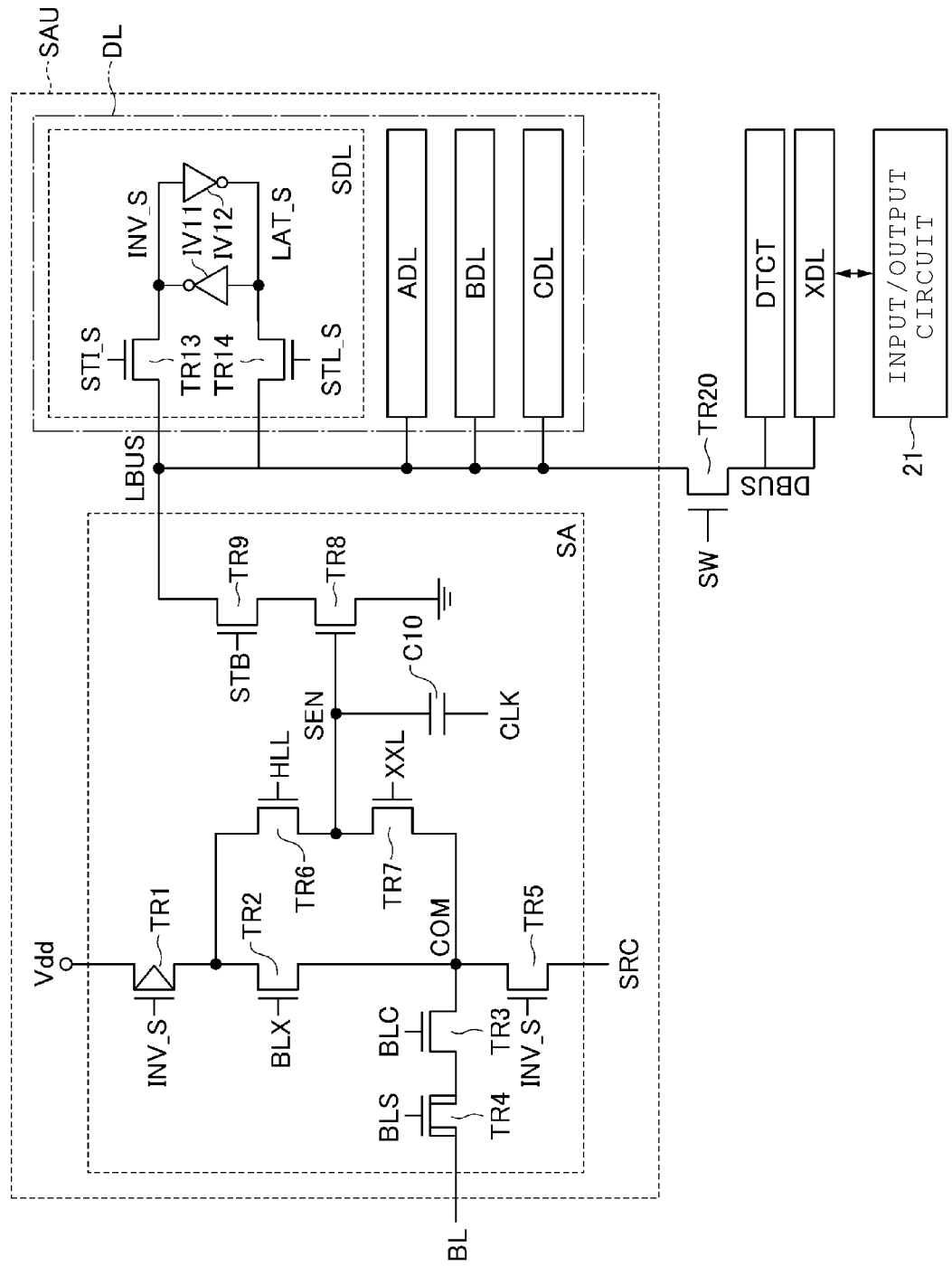
FIG. 5 is a diagram illustrating a circuit configuration of a sense amplifier unit.

The sense amplifier module 120 includes a plurality of sense amplifier units SAU corresponding to the plurality of bit lines BL, respectively. One sense amplifier unit SAU is connected to one bit line BL. That is, it can be said that the sense amplifier unit SAU is a circuit connected to the memory cell transistor MT of the string unit SU via the bit line BL. In FIG. 5, a detailed circuit configuration of one sense amplifier unit SAU is illustrated.

As illustrated in FIG. 5, the sense amplifier unit SAU includes a sense amplifier circuit SA and latch circuits SDL, ADL, BDL, CDL, and XDL. The sense amplifier circuit SA and the latch circuits SDL, ADL, BDL, CDL, and XDL are connected so that data can be transmitted to and received from each other via the buses (LBUS and DBUS). More specifically, the latch circuits SDL, ADL, BDL, and CDL are commonly connected via the bus LBUS, and the latch circuit XDL is connected to the bus DBUS. The bus LBUS and the bus DBUS are connected via a transistor TR20. A signal SW is input to the gate of the transistor TR20.

Figure 6:
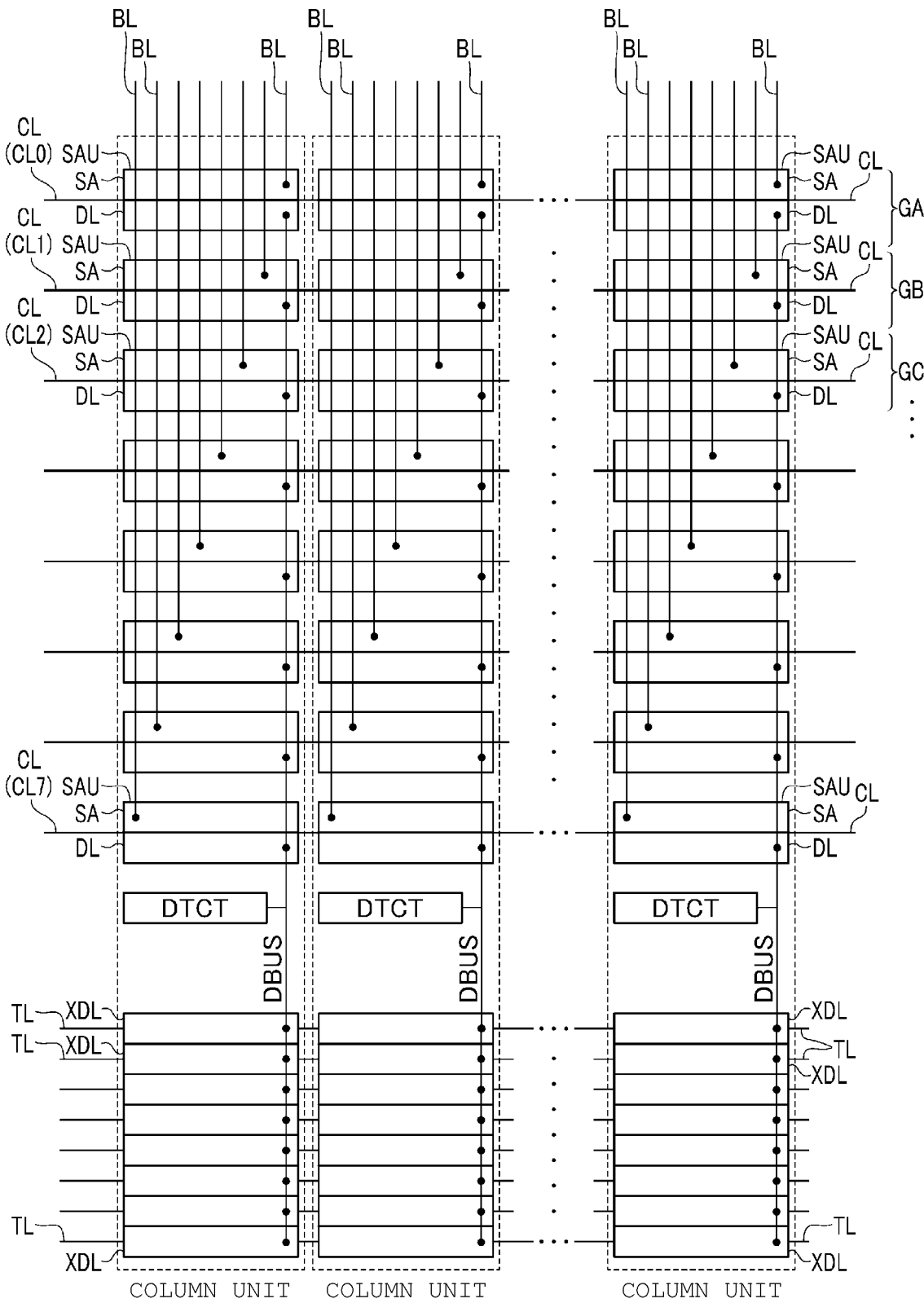
FIG. 6 is a diagram illustrating arrangement of a plurality of sense amplifier units.

Further, the latch circuit XDL is provided in a part of the sense amplifier units SAU as described above, but is not provided in each of the sense amplifier units SAU in a divided manner, the plurality of latch circuits XDL provided in the plurality of sense amplifier units SAU are collectively provided for each certain number (see FIG. 6). Therefore, in FIG. 5, the latch circuit XDL is illustrated outside the dotted line indicating the sense amplifier unit SAU.

For example, in the read operation, the sense amplifier circuit SA senses data read to the corresponding bit line BL and determines whether the read data is "0" or "1". The sense amplifier circuit SA includes, for example, a transistor TR1 that is a p-channel MOS transistor, transistors TR2 to TR9 that are n-channel MOS transistors, and a capacitor C10.

One end of the transistor TR1 is connected to a power line, and the other end of the transistor TR1 is connected to the transistor TR2. The gate of the transistor TR1 is connected to a node INV_S in a latch circuit SDL. One end of the transistor TR2 is connected to the transistor TR1, and the other end of the transistor TR2 is connected to a node COM. A signal BLX is input to the gate of the transistor TR2. One end of a transistor TR3 is connected to the node COM, and the other end of the transistor TR3 is connected to a transistor TR4. A signal BLC is input to the gate of the transistor TR3. The transistor TR4 is a high breakdown voltage MOS transistor. One end of the transistor TR4 is connected to the transistor TR3. The other end of the transistor TR4 is connected to the corresponding bit line BL. A signal BLS is input to the gate of the transistor TR4.

One end of a transistor TR5 is connected to the node COM, and the other end of the transistor TR5 is connected to a node SRC. The gate of the transistor TR5 is connected to the node INV_S. One end of a transistor TR6 is connected between the transistor TR1 and the transistor TR2, and the other end of the transistor TR6 is connected to a node SEN. A signal HLL is input to the gate of the transistor TR6. One end of a transistor TR7 is connected to the node SEN, and the other end of the transistor TR7 is connected to the node COM. A signal XXL is input to the gate of the transistor TR7.

One end of a transistor TR8 is grounded, and the other end of the transistor TR8 is connected to a transistor TR9. The gate of the transistor TR8 is connected to the node SEN. One end of the transistor TR9 is connected to the transistor TR8, and the other end of the transistor TR9 is connected to the bus LBUS. A signal STB is input to the gate of the transistor TR9. One end of the capacitor C10 is connected to the node SEN. A clock CLK is input to the other end of the capacitor C10.

The signals SW, BLX, BLC, BLS, HLL, XXL, and STB are generated, for example, by the sequencer 41. Further, for example, a voltage Vdd that is an internal power voltage of the semiconductor storage device 2 is applied to the power line connected to one end of the transistor TR1, and for example, a voltage Vss that is a ground voltage of the semiconductor storage device 2 is applied to a node SRC.

The latch circuits SDL, ADL, BDL, CDL, and XDL temporarily store read data or write data. The latch circuit XDL is connected to the input/output circuit 21 and is used for input and output of data between the sense amplifier unit SAU and the input/output circuit 21.

The latch circuit SDL includes, for example, inverters IV11 and IV12 and transistors TR13 and TR14 that are n-channel MOS transistors. An input node of the inverter IV11 is connected to a node LAT_S. An output node of the inverter IV11 is connected to the node INV_S. An input node of the inverter IV12 is connected to the node INV_S. An output node of the inverter IV12 is connected to the node LAT_S. One end of the transistor TR13 is connected to the node INV, and the other end of the transistor TR13 is connected to the bus LBUS. A signal STI_S is input to the gate of the transistor TR13. One end of the transistor TR13 is connected to the node LAT_S, and the other end of the transistor TR14 is connected to the bus LBUS. A signal STL_S is input to the gate of the transistor TR14. For example, the data stored in the node LAT_S corresponds to the data stored in the latch circuit SDL. In addition, the data stored in the node INV_S corresponds to inverted data of the data stored in the node LAT_S. Since the circuit configurations of the latch circuits ADL, BDL, CDL, and XDL are the same as the circuit configuration of the latch circuit SDL, and thus the description thereof is omitted.

As described above, the plurality of sense amplifier units SAU are provided in correspondence with the bit lines BL. In other words, the plurality of sense amplifier units SAU are provided according to at least the number of the memory cell transistors MT to be targets of the write operation. In FIG. 6, specific arrangement of the plurality of sense amplifier units SAU is illustrated in a top view. In FIG. 6, the sense amplifier units SAU each are schematically illustrated to be divided into "SA" indicating the sense amplifier circuit SA and "DL" indicating all of the latch circuits SDL, ADL, BDL, and CDL. A portion to which the reference numeral "DL" is added in FIG. 6 is hereinafter also referred to as "the latch circuit unit DL".

In the present embodiment, every eight bit lines BL continuously located are regarded as one group, and eight sense amplifier units SAU connected to the bit lines BL in the same group are located in parallel along a direction in which the bit lines BL extend (the vertical direction in FIG. 6). This arrangement enables the sense amplifier units SAU to be connected to the bit lines BL, respectively, while keeping the interval between the bit lines BL adjacent to each other sufficiently narrow.

The sense amplifier units SAU belonging to the different groups are located in parallel in a direction perpendicular to the direction in which the bit lines BL extend (horizontal direction in FIG. 6). Common control lines CL are connected to the plurality of sense amplifier units SAU located in parallel in the corresponding direction. The control lines CL are lines for transmitting control signals from the sequencer 41 (such as the signal BLX, the signal BLS, or the signal STI described above). Further, the plurality of control lines CL are connected to one sense amplifier unit SAU, but the plurality of control lines CL are illustrated as one line in FIG. 6.

In such a configuration, the plurality of sense amplifier units SAU located in parallel in the horizontal direction in FIG. 6 perform the same operation based on the signals from the common control lines CL. Meanwhile, the plurality of sense amplifier units SAU located in parallel in the vertical direction in FIG. 6 can perform different operations by receiving different signals from the respective control lines CL.

The plurality of sense amplifier units SAU located in parallel in the vertical direction in FIG. 6, that is, eight sense amplifier units SAU belonging to the same group are connected to each other via one bus DBUS. Further, eight latch circuits XDL are provided for the eight sense amplifier units SAU, are located in parallel in the direction in which the bit lines BL extend (vertical direction in FIG. 6), and are connected to each other via the same bus DBUS.

The latch circuits XDL of the sense amplifier units SAU belonging to the different groups are located in parallel in a perpendicular direction to the direction in which the bit lines BL extend (horizontal direction in FIG. 6). A common transfer line TL is connected to the plurality of latch circuits XDL located in parallel in the corresponding direction. The transfer line TL is a line for transmitting data between the latch circuit XDL and the input/output circuit 21.

A bit detection circuit DTCT is provided in the middle of the bus DBUS connecting latch circuit units DL and the latch circuits XDL. The bit detection circuit DTCT is a circuit used for counting specific information from verification result data when performing a bit scan operation.

Referring back to FIG. 2, the row decoder 130 is a circuit configured as a switch group (not illustrated) in order to apply voltages to the word lines WL. The row decoder 130 receives a block address and a row address from the register 42 and selects the corresponding block BLK based on the corresponding block address and also the corresponding word line WL based on the corresponding row address. The row decoder 130 switches between opening and closing of the switch group so that the voltage from the voltage generation circuit 43 is applied to the selected word line WL. The operation of the row decoder 130 is controlled by the sequencer 41.

The input/output circuit 21 transmits and receives the signal DQ<7:0> and the data strobe signals DQS and /DQS to and from the memory controller 1. The input/output circuit 21 transmits a command and an address in the signal DQ<7:0> to the register 42. In addition, the input/output circuit 21 transmits and receives write data and read data to and from the sense amplifier module 120.

The logic control circuit 22 receives the chip enable signal /CE, the command latch enable signal CLE, the address latch enable signal ALE, the write enable signal /WE, the read enable signals /RE and RE, and the write protect signal /WP from the memory controller 1. In addition, the logic control circuit 22 transmits the ready busy signal R/B to the memory controller 1 and notifies the state of the semiconductor storage device 2 to the outside.

The sequencer 41 controls various operations including the memory cell array 110 based on a control signal input from the memory controller 1 to an interface circuit 20. The sequencer 41 corresponds to a "control circuit" in the present embodiment. Both the sequencer 41 and the logic control circuit 22 can be considered as "control circuits" in the present embodiment.

The register 42 includes a command register 42A, an address register 42B, and a status register 42C. A command CMD for instructing a write operation, a read operation, an erasing operation, and the like is temporarily stored in the command register 42A. The corresponding command CMD is input from the memory controller 1 to the input/output circuit 21, then is transmitted from the input/output circuit 21 to the command register 42A, and is stored.

An address ADD corresponding to the command CMD is also stored in the address register 42B. The corresponding address ADD is also input from the memory controller 1 to the input/output circuit 21, then is transmitted from the input/output circuit 21 to the address register 42B, and is stored.

Status information STT indicating an operation state of the semiconductor storage device 2 is also stored in the status register 42C. The status information STT is updated each time by the sequencer 41 according to the operation state of the memory cell array 110 and the like. In addition, the status information STT is output from the input/output circuit 21 to the memory controller 1 as the state signal according to a request from the memory controller 1.

The voltage generation circuit 43 is a circuit for generating voltage required respectively for a write operation, a read operation, and an erasing operation of data in the memory cell array 110. Examples of the voltage include voltages to be applied to the word lines WL and voltages to be applied to the bit lines BL. The operation of the voltage generation circuit 43 is controlled by the sequencer 41.

The input/output pad group 31 is a portion where a plurality of terminals (pads) are provided for transmitting and receiving signals between the memory controller 1 and the input/output circuit 21. The terminals are independently provided in correspondence with the signal DQ<7:0>, and the data strobe signals DQS and /DQS, respectively.

The logic control pad group 32 is a portion where a plurality of terminals (pads) are provided for transmitting and receiving respective signals between the memory controller 1 and the logic control circuit 22. The terminals are independently provided in correspondence with the chip enable signal /CE, the command latch enable signal CLE, the address latch enable signal ALE, the write enable signal /WE, the read enable signals /RE and RE, the write protect signal /WP, and the ready busy signal R/B, respectively.

The power input terminal group 33 is a portion where a plurality of terminals are provided for receiving the application of the voltages required for the operations of the semiconductor storage device 2. The voltages to be applied to the terminals include the power voltages Vcc, VccQ, and Vpp, and the ground voltage Vss.

The power voltage Vcc is a circuit power voltage applied from the outside as operation power and is, for example, a voltage of about 3.3 V. The power voltage VccQ is, for example, a voltage of 1.2 V. The power voltage VccQ is a voltage used for transmitting and receiving signals between the memory controller 1 and the semiconductor storage device 2. The power voltage Vpp is a power voltage higher than the power voltage Vcc and is, for example, a voltage of 12 V.

For writing or erasing data into and from the memory cell array 110, a high voltage (VPGM) of about 20 V is required. At this time, it is possible to generate a desired voltage at a higher speed and with lower power consumption by boosting the power voltage Vpp of about 12 V than by boosting the power voltage Vcc of about 3.3 V by a booster circuit of the voltage generation circuit 43. Meanwhile, for example, when the semiconductor storage device 2 is used in an environment where a high voltage cannot be supplied, a voltage may not be supplied to the power voltage Vpp. Even if the power voltage Vpp is not supplied, when the power voltage Vcc is supplied, the semiconductor storage device 2 can perform various operations. That is, the power voltage Vcc is power normally supplied to the semiconductor storage device 2, and the power voltage Vpp is power additionally supplied, for example, according to the use environment.

Figure 7:
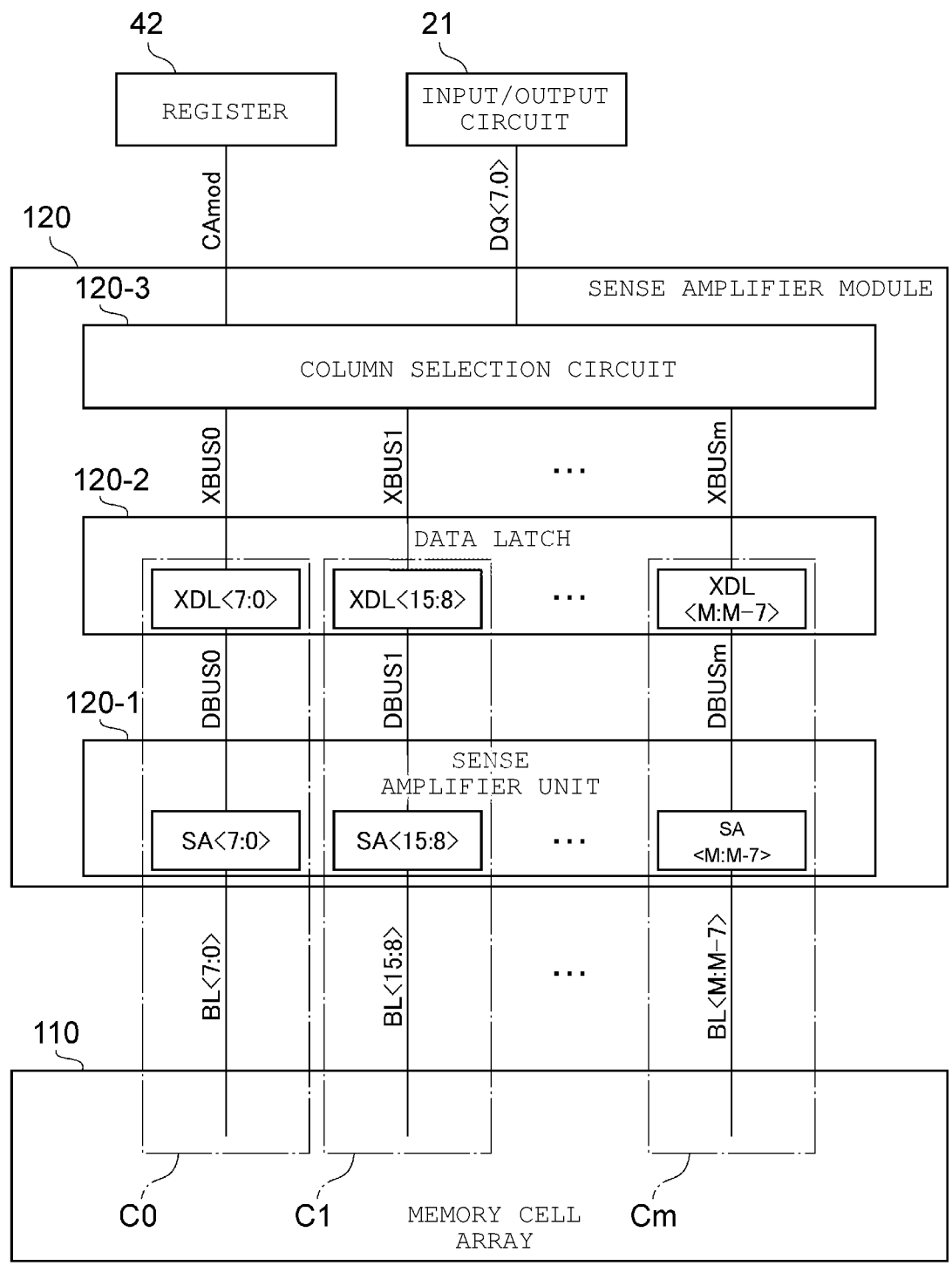
FIG. 7 is a block diagram illustrating an example of a connection relationship of a sense amplifier module, an input/output circuit, a register, and the memory cell array provided in a semiconductor storage device according to the embodiment.

Next, a configuration of a sense amplifier module provided in a memory device according to the embodiment is described. FIG. 7 is a block diagram illustrating an example of a connection relationship between the sense amplifier module 120 and the input/output circuit 21, the register 42, and the memory cell array 110 in the memory device according to the embodiment. As illustrated in FIG. 7, the sense amplifier module 120 includes a sense amplifier unit 120-1, a data latch 120-2, and a column selection circuit 120-3.

The sense amplifier module 120 selects a bit line based on the column address provided in the address ADD stored in the register 42 (the address register 42B). The sense amplifier module 120 transmits write data DAT to the memory cell array 110 via the selected bit line in the write operation of data. In the read operation of data, the sense amplifier module 120 senses a threshold voltage of a memory cell transistor via the selected bit line. Also, the sense amplifier module 120 generates read data DAT based on a sense result.

The sense amplifier unit 120-1 is a circuit for sensing a threshold voltage and generating the read data DAT in the read operation. The sense amplifier unit 120-1 includes, for example, (M+1) sense amplifier circuits SA (FIG. 5). The (M+1) sense amplifier circuits SA are classified into (m+1) sense amplifier groups SA<7:0>, SA<15:8>, . . . , and SA<M:M−7> each including eight sense amplifier circuits SA (m is an integer satisfying, for example, (m+1)=(M+1)/8). In the example of FIG. 7, a case where m is 2 or more (that is, M is 23, 31, . . . ) is illustrated.

Eight sense amplifier circuits SA<0> to SA<7> in the sense amplifier group SA<7:0> are connected to bit lines BL<0> to BL<7>, respectively. Eight sense amplifier circuits SA<8> to SA<15> in the sense amplifier group SA<15:8> are connected to bit lines BL<8> to BL<15>, respectively. Hereinafter, similarly, eight sense amplifier circuits SA<M−7> to SA<M> in the sense amplifier group SA<M:M−7> are connected to bit lines BL<M−7> to BL<M>, respectively.

The data latch 120-2 is a latch that temporarily stores the data DAT transmitted and received to and from the input/output circuit 21. The data latch 120-2 includes, for example, (M+1) data latches XDL. The (M+1) data latches XDL are classified into (m+1) data latch groups XDL<7:0>, XDL<15:8>, . . . , and XDL<M:M−7> including the eight data latches XDL, respectively.

The data latch group XDL<7:0> is connected to the sense amplifier group SA<7:0> via a bus DBUS0. The data latch group XDL<15:8> is connected to the sense amplifier group SA<15:8> via a bus DBUS1. Hereinafter, similarly, the data latch group XDL<M:M−7> is connected to the sense amplifier group SA<M:M−7> via a bus DBUSm.

In the following description, a set that includes the memory cell transistors MT, the sense amplifier group SA<7:0>, and the data latches XDL<7:0> connected to a bit line <7:0> is also referred to as a column C0. A set that includes the memory cell transistors MT, the sense amplifier group SA<15:8>, and the data latch XDL<15:8> connected to a bit line <15:8> is also referred to as a column C1. Hereinafter, similarly, a set that includes the memory cell transistors MT, a sense amplifier group SA<M:M−8>, and the data latch XDL<M:M−8> connected to a bit line <M:M−8> is also referred to as a column Cm. The columns C0, C1, . . . , and Cm can be associated with column addresses CA0, CA1, . . . , and CAm, respectively.

The column selection circuit 120-3 is a circuit for selecting a column. The column selection circuit 120-3 is connected to the data latch groups XDL<7:0>, XDL<15:8>, ..., and XDL<M:M−8> via buses XBUS<0>, XBUS<1>, ..., and XBUS<m>. The column selection circuit 120-3 receives a column address CAmod from the register 42 (the address register 42B). The column address CAmod uniquely identifies any one of the column addresses CA0 to CAm.

For example, in the write operation, the column selection circuit 120-3 receives the signal DQ<7:0> including the write data DAT from the input/output circuit 21. Also, the column selection circuit 120-3 transmits the write data DAT to the selected column based on the column address CAmod.

In addition, for example, in the read operation, the column selection circuit 120-3 receives the read data DAT from the column selected based on the column address CAmod. Also, the column selection circuit 120-3 transmits the signal DQ<7:0> including the read data DAT to the input/output circuit 21.

Figure 8:
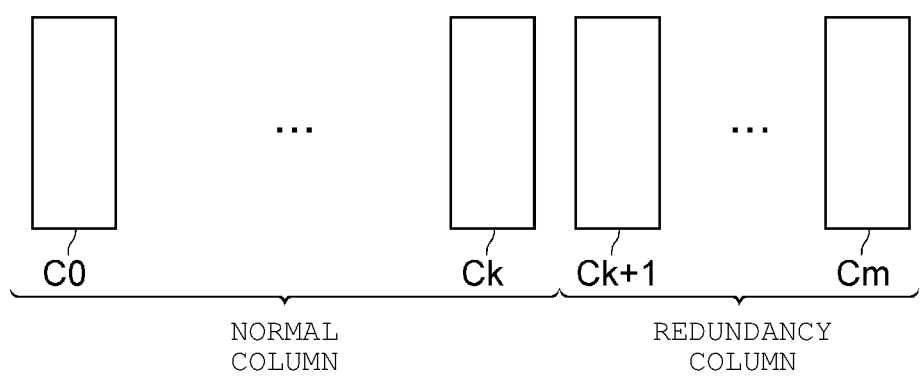
FIG. 8 is a block diagram illustrating an example of a configuration of a column according to the embodiment.

FIG. 8 is a block diagram illustrating an example of a configuration of a column according to the embodiment. As illustrated in FIG. 8, the columns C0 to Cm are classified, for example, into the normal columns C0 to Ck and redundancy columns C(k+1) to Cm (0<k<m). The normal columns C0 to Ck are columns preferentially used with respect to the redundancy columns. The redundancy columns C(k+1) to Cm are used as substitutes for the normal columns C0 to Ck.

When a column to be selected in the normal columns C0 to Ck is normal, the address register 42B transmits a column address corresponding to the corresponding column to be selected (access address) to the column selection circuit 120-3 as the column address CAmod. Meanwhile, when a column to be selected in the normal columns C0 to Ck is defective, the address register 42B transmits a column address corresponding to a certain column in the redundancy columns C(k+1) to Cm to the column selection circuit 120-3 as the column address CAmod.

By the above configuration, the write operation and the read operation are performed while avoiding selection of a defective column.

Figure 9:
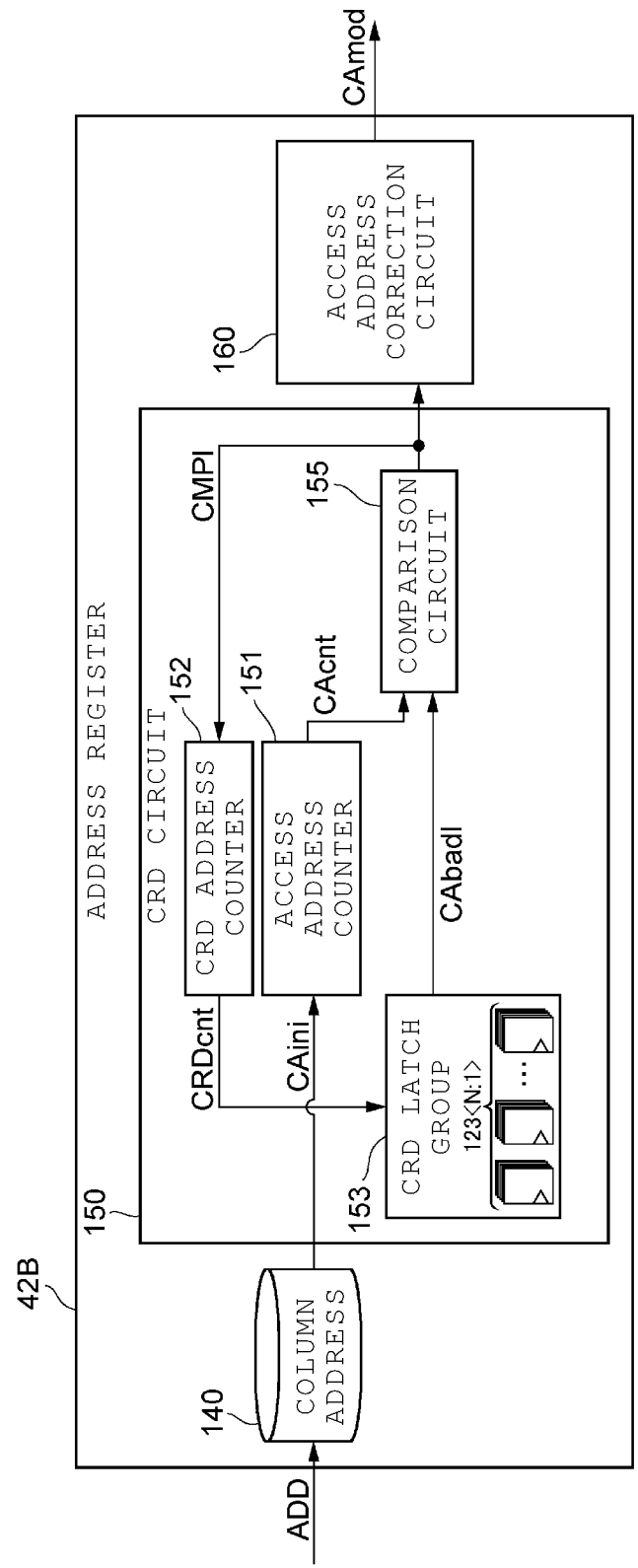
FIG. 9 is a block diagram illustrating an example of a part of a configuration of the register according to the embodiment.

Next, a configuration of the address register 42B according to the embodiment is described. FIG. 9 is a block diagram illustrating an example of a part of a configuration of the address register 42B according to the embodiment. As illustrated in FIG. 2, the register 42 includes the address register 42B. The address register 42B includes a column address register 140 that stores a column address provided in the address ADD. Also, the address register 42B further includes a CRD circuit 150 and an access address correction circuit 160.

The CRD circuit 150 includes an access address counter 151, a CRD address counter 152, a CRD latch group 153, and a comparison circuit 155. The CRD latch group 153 is implemented as a semiconductor device.

The access address counter 151 receives a column address CAini from the column address register 140. The access address counter 151 generates a column address CAcnt based on the column address CAini. The column address CAini is a column address to be selected first for the write operation and the read operation. The column address CAcnt is a column address obtained by incrementing the column address CAini as an initial value. The access address counter 151 transmits the column address CAcnt to the comparison circuit 155.

The CRD address counter 152 receives a signal CMP1 from the comparison circuit 155. The signal CMP1 is a 1-bit signal. The signal CMP1 in a "High (H)" level (may be also referred to as a high level) indicates that the column address CAcnt corresponds to a defective column. The signal CMP1 in an "L" level indicates that the column address CAcnt corresponds to a normal column. When the signal CMP1 in an "H" level is received, the CRD address counter 152 increments an address CRDcnt. The address CRDcnt is an address corresponding to any one of a plurality of CRD latches in the CRD latch group 153. The CRD address counter 152 transmits the address CRDcnt to the CRD latch group 153.

The CRD latch group 153 includes N CRD latches 123<N:1> (N is an integer of 2 or more). Each of the N CRD latches 123<N:1> is a latch that stores a column address corresponding to a defective column. The address CRDcnt corresponding to the N CRD latches 123<N:1> are in ascending order of the CRD latches 123<1>, 123<2>, ..., and 123<N>. In addition, for example, according to the hard reset operation of a memory device 10, column addresses corresponding to the defective columns are stored in ascending order of the CRD latches 123<1>, 123<2>, ..., and 123<N> in the N CRD latches 123<N:1>. In addition, after the hard reset operation, the column addresses stored in the N CRD latches 123<N:1> may not be in ascending order of the CRD latches 123<1>, 123<2>, ..., and 123<N> due to unintended data inversion and the like (column address storage rules may not be observed).

The CRD latch group 153 selects the CRD latch corresponding to the address CRDcnt. For example, in a case of the address CRDcnt=Y, the CRD latch group 153 transmits a column address stored in a CRD latch 123<Y> to an address latch 124 as a column address CAbad (1≤Y≤N).

The comparison circuit 155 compares the column address CAcnt received from the access address counter 151 and the column address CAbad received from the CRD latch group 153. As a result of the comparison, when the column address CAcnt is identical to the column address CAbad, the comparison circuit 155 generates the signal CMP1 in an "H" level. As a result of the comparison, when the column address CAcnt is not identical to the column address CAbad, the comparison circuit 155 generates the signal CMP1 in an "L" level. The comparison circuit 155 transmits the signal CMP1 to the CRD address counter 152 and the access address correction circuit 160.

The access address correction circuit 160 generates the column address CAmod based on the signal CMP1 received from the comparison circuit 155. Specifically, when the signal CMP1 is in an "L" level, the access address correction circuit 160 applies the column address CAcnt to the column address CAmod. When the signal CMP1 is in an "H" level, the access address correction circuit 160 applies the column address corresponding to one column in the redundancy columns C(k+1) to Cm to the column address CAmod. The access address correction circuit 160 transmits the generated column address CAmod to the column selection circuit 120-3.

Next, the operation of the address register 42B according to the embodiment is described with reference to a case of selecting a column in the redundancy columns C(k+1) to Cm, particularly when the column to be selected in the normal columns C0 to Ck is defective. Also, in this example, the CRD latch group 153 includes CRD latches 123<3>, 123<6>, 123<10>, and 123<12> as latches for storing addresses corresponding to defective columns.

Figure 10:
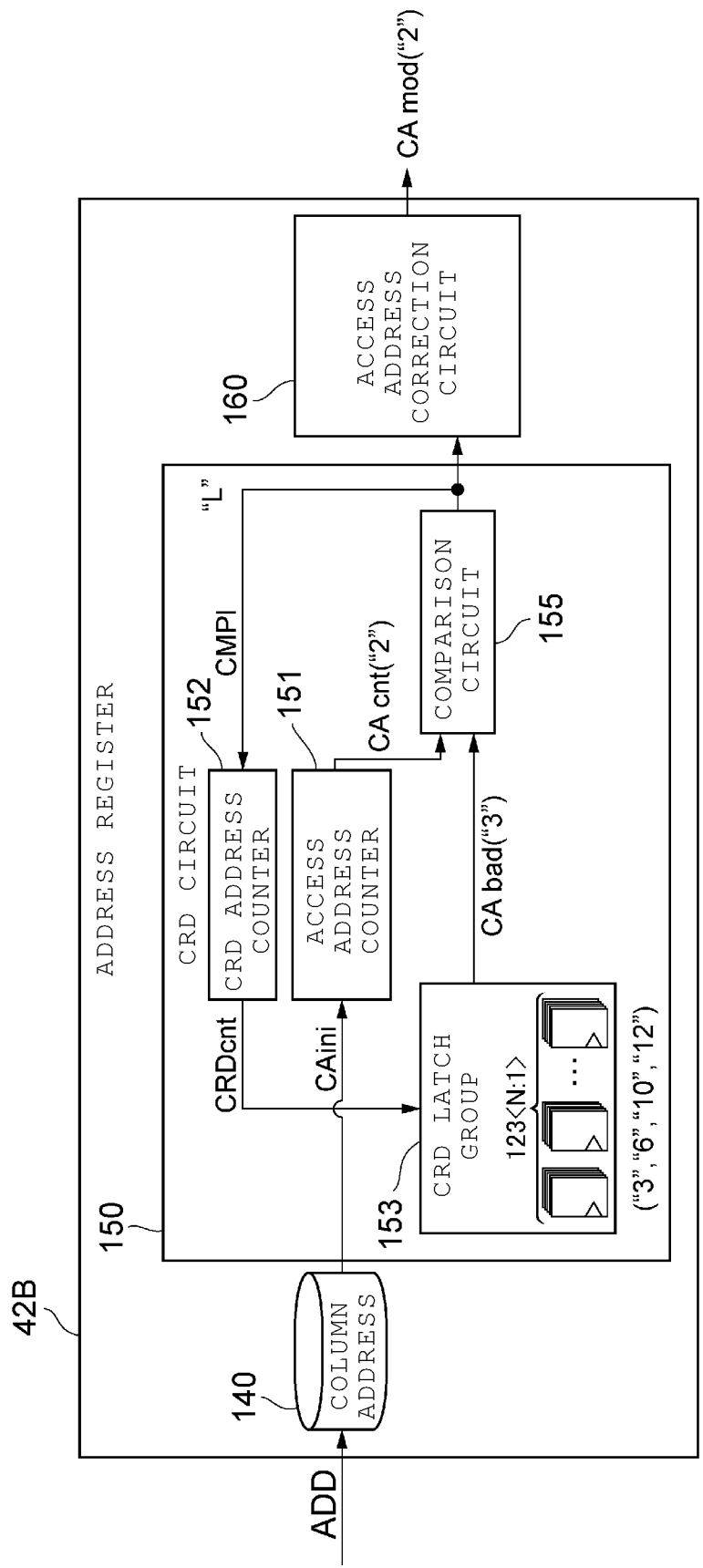
FIG. 10 is a diagram illustrating an operation of an address register according to the embodiment.

First, as illustrated in FIG. 10, the access address counter 151 receives an initial value of "0" as the column address CAini. Then, the access address counter 151 transmits "2" as the column address CAcnt obtained by incrementing the column address CAini to the comparison circuit 155. Also, the comparison circuit 155 compares "2" received from the access address counter 151 as the column address CAcnt and "3" received from the CRD latch group 153 as the column address CAbad. In this case, since the column address CAcnt is not identical to the column address CAbad, the comparison circuit 155 generates the signal CMP1 in an "L" level and transmits the generated signal CMP1 in an "L" level to the CRD address counter 152 and the access address correction circuit 160. Since the signal CMP1 is in an "L" level, the access address correction circuit 160 applies the column address CAcnt to the column address CAmod.

Figure 11:
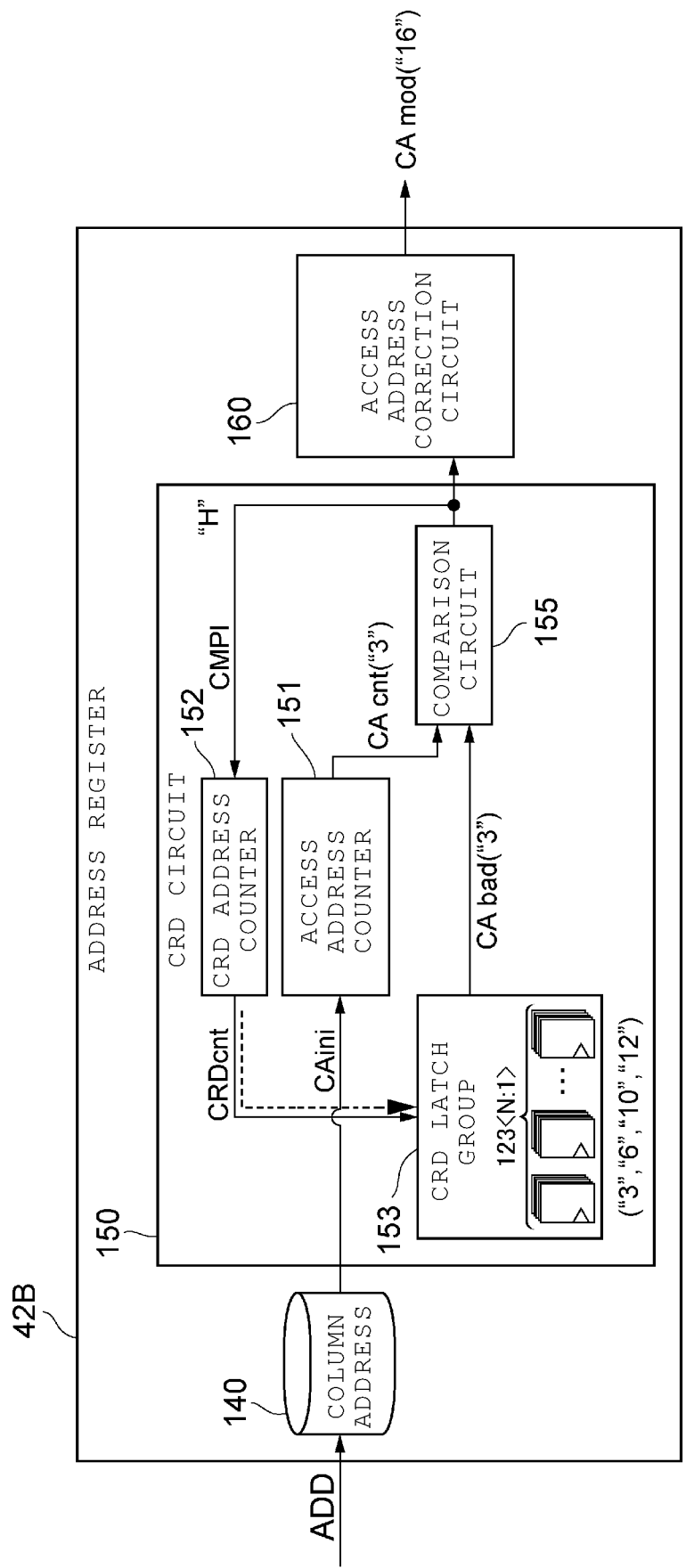
FIGS. 11 and 12 are diagrams illustrating an operation of the address register according to the embodiment.

Next, as illustrated in FIG. 11, the access address counter 151 transmits "3" as the column address CAcnt obtained by further incrementing the column address CAini to the comparison circuit 155. Also, the comparison circuit 155 compares "3" received from the access address counter 151 as the column address CAcnt and "3" received from the CRD latch group 153 as the column address CAbad. In this case, since the column address CAcnt is identical to the column address CAbad, the comparison circuit 155 generates the signal CMP1 in an "H" level and transmits the generated signal CMP1 in an "H" level to the CRD address counter 152 and the access address correction circuit 160. Since the signal CMP1 is in an "H" level, the access address correction circuit 160 applies the column address corresponding to one column in the redundancy columns C(k+1) to Cm to the column address CAmod. Also, when the CRD address counter 152 receives the signal CMP1 in an "H" level, the CRD address counter 152 increments the address CRDcnt. Also, the CRD address counter 152 transmits the incremented address CRDcnt to the CRD latch group 153.

Thereafter, while repeating the increment of the column address CAini, the address register 42B sequentially compares the column address CAcnt and the column address CAbad. Accordingly, when a defective column in the normal columns C0 to Ck is selected as a column to be selected, the corresponding selected column is switched to one column in the redundancy columns C(k+1) to Cm.

Figure 12:
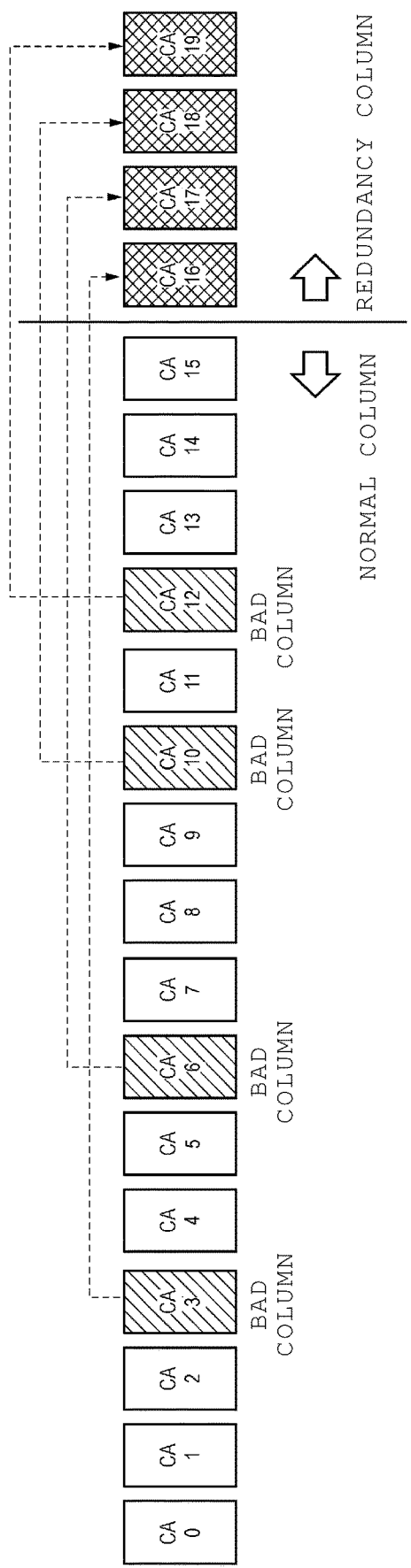

In this example, as illustrated in FIG. 12, since columns CA3, CA6, CA10, and CA12 in the normal columns C0 to Ck are defective columns, when the columns CA3, CA6, CA10, and CA12 are selected as columns to be selected, the corresponding selected columns are sequentially switched to columns CA16, CA17, CA18, and CA19 in the redundancy columns C(k+1) to Cm.

Figure 13:
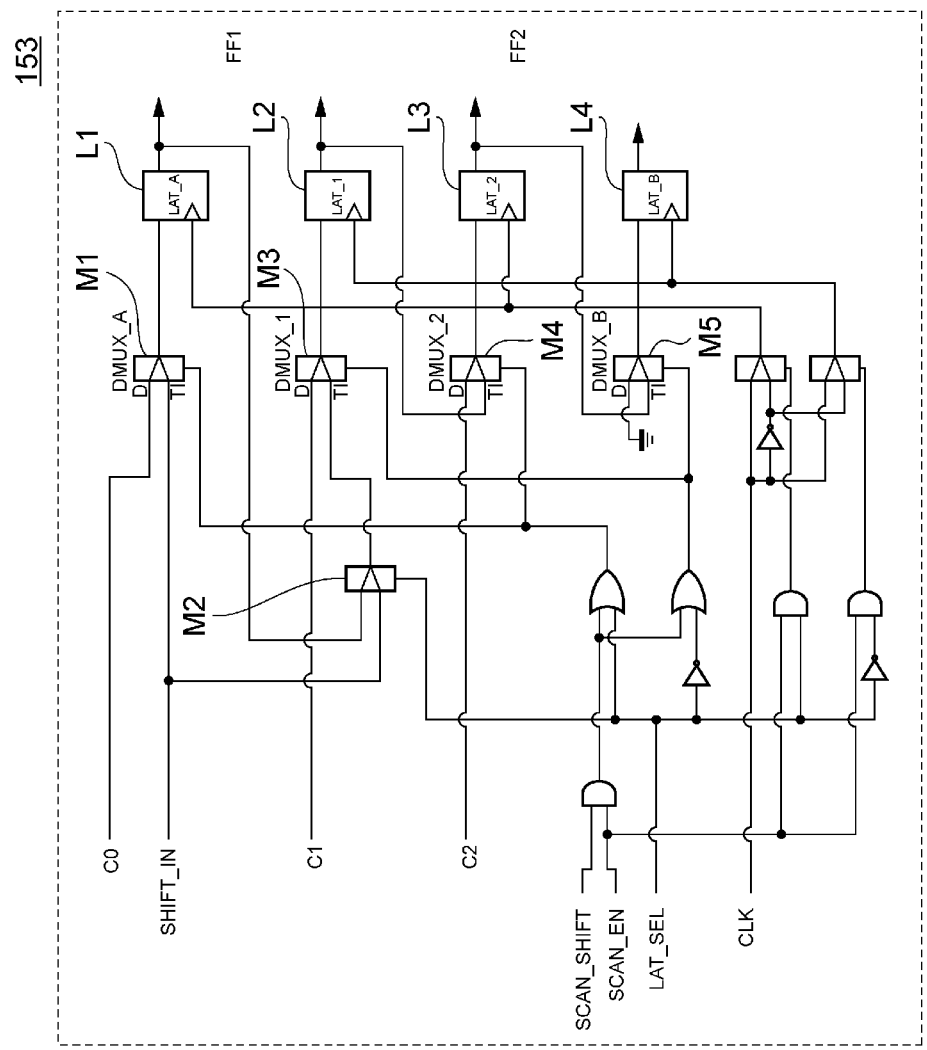
FIG. 13 is a diagram illustrating an example of a configuration of a CRD latch group according to the embodiment.

Next, the CRD latch group 153 according to the embodiment is described. FIG. 13 is a diagram illustrating an example of a configuration of the CRD latch group 153 according to the embodiment. As illustrated in FIG. 13, the CRD latch group 153 includes a first multiplexer M1, a second multiplexer M2, a third multiplexer M3, a fourth multiplexer M4, and a fifth multiplexer M5 as portions that switch input data. The CRD latch group 153 includes a first latch circuit L1, a second latch circuit L2, a third latch circuit L3, and a fourth latch circuit L4 as portions that transmit the input data from the input side to the output side. The first latch circuit L1, the second latch circuit L2, the third latch circuit L3, and the fourth latch circuit L4 are connected in series in this order, from the input side to the output side.

The operation modes of the CRD latch group 153 include a normal mode of outputting data from a prior-stage circuit and a scan test mode of detecting a failure of the first latch circuit L1, the second latch circuit L2, the third latch circuit L3, or the fourth latch circuit L4. The input terminal of the first latch circuit L1 is connected to a first external terminal (for example, "Input0" in FIG. 14A). In the input terminal of the first latch circuit L1, test data used for detecting a failure of the first latch circuit L1, the second latch circuit L2, the third latch circuit L3, or the fourth latch circuit L4 is input in the scan test mode, and output data from a prior-stage circuit is output in the normal mode. The output terminal of the third latch circuit L3 is connected to the second external terminal to which the test data is output in the scan test mode. In addition, the output terminal of the third latch circuit L3 outputs the test data to the second external terminal via the first latch circuit L1, the second latch circuit L2, the third latch circuit L3, or the fourth latch circuit L4 in the scan test mode.

The first multiplexer M1 is a circuit that includes two input terminals and one output terminal and outputs any item of data input to the two input terminals from the output terminal according to the selection control input. The two input terminals include a first input terminal connected to the output terminal of the prior-stage circuit and a second input terminal connected to the output terminal of the sequencer 41. The output data from the prior-stage circuit is input to the first input terminal. A signal SHIFT_IN is input to the second input terminal. When the sequencer 41 receives instruction of a scan test from an external tester, the signal SHIFT_IN is test data of the scan test input to the first latch circuit L1. When a signal LAT_SEL is in an "H" level, the selection control input enters an "H" level regardless of a signal SCAN_SHIFT and a signal SCAN_EN. Meanwhile, the selection control input enters an "H" level, when the signal LAT_SEL is in an "L" level, the signal SCAN_SHIFT is in an "H" level, and the signal SCAN_EN is in an "H" level, and enters an "L" level when at least one of the signal SCAN_SHIFT and the signal SCAN_EN is in an "L" level. When performing the scan test, the signal SCAN_SHIFT is a signal for shifting data between adjacent latch circuits and repeats an "H" level and an "L" level at a predetermined cycle. The signal SCAN_EN is a flag signal related to the scan test, and becomes an "H" level at the time of performing a scan test. Also, in the first multiplexer M1, when the selection control input is in an "H" level, the test data of the scan test input to the second input terminal is output from the output terminal, and when the selection control input is in an "L" level, the output data from the prior-stage circuit that is input to the first input terminal is output from the output terminal.

The first latch circuit L1 is a circuit that includes one input terminal, one output terminal, and one clock terminal and switches whether to transmit data input to the input terminal and output the data from the output terminal according to the clock signal input to the clock terminal. The data output from the output terminal of the first multiplexer M1 is input to one input terminal. When the signal LAT_SEL is in an "L" level, the clock signal output from the sequencer 41 is input to one clock terminal without inverting the signal value, regardless of the signal SCAN_EN. Meanwhile, when the signal LAT_SEL is in an "H" level and the signal SCAN_EN is in an "H" level, the clock signal output from the sequencer 41 is input to one clock terminal with the signal value inverted, and when the signal SCAN_EN is in an "L" level, the clock signal output from the sequencer 41 is input without inverting the signal value. The first latch circuit L1 sets the data input to the input terminal and stores the set data while the clock input is maintained in an "H" level. Meanwhile, the first latch circuit L1 transmits the stored data at a timing when the clock input is switched from an "H" level to an "L" level and outputs the data from the output terminal.

The second multiplexer M2 is a circuit that includes two input terminals and one output terminal and outputs any data input to the two input terminals from the output terminal according to the selection control input. The two input terminals include a first input terminal connected to the output terminal of the first latch circuit L1 and a second input terminal connected to the output terminal of the sequencer 41. The output data from a prior-stage circuit is input to the first input terminal. The signal SHIFT_IN is input to the second input terminal. The selection control input enters an "H" level when the signal LAT_SEL is in an "H" level and enters an "L" level when the signal LAT_SEL is in an "L" level. Also, in the second multiplexer M2, when the selection control input is in an "H" level, the test data of the scan test input to the second input terminal is output from the output terminal, and when the selection control input is in an "L" level, the output data from the prior-stage circuit that is input to the first input terminal is output from the output terminal.

The third multiplexer M3 is a circuit that includes two input terminals and one output terminal and outputs any data input to the two input terminals from the output terminal according to the selection control input. The two input terminals include a first input terminal connected to the output terminal of a prior-stage circuit and a second input terminal connected to the output terminal of the second multiplexer M2. When the signal LAT_SEL is in an "L" level, the selection control input enters an "H" level regardless of the signal SCAN_SHIFT and the signal SCAN_EN. Meanwhile, when the signal LAT_SEL is in an "H" level, the selection control input enters an "H" level if the signal SCAN_SHIFT is in an "H" level and the signal SCAN_EN is in an "H" level, and enters an "L" level if at least one of the signal SCAN_SHIFT and the signal SCAN_EN is in an "L" level. Also, in the third multiplexer M3, the output data from the second multiplexer M2 that is input to the second input terminal is output from the output terminal when the selection control input is in an "H" level, and output data from the prior-stage circuit that is input to the first input terminal is output from the output terminal when the selection control input is in an "L" level.

The second latch circuit L2 is a circuit that includes one input terminal, one output terminal, and one clock terminal, and switches whether to transmit data input to the input terminal and output the data from the output terminal according to the clock signal input to the clock terminal. The output data from the output terminal of the third multiplexer M3 is input to the one input terminal. When the signal LAT_SEL is in an "H" level, the clock signal output from the sequencer 41 is input to the one clock terminal without inverting the signal value, regardless of the signal SCAN_EN. Meanwhile, the clock signal output from the sequencer 41 is input to the one clock terminal with the signal value inverted when the signal LAT_SEL is in an "L" level, and the signal SCAN_EN is in an "H" level, and the clock signal output from the sequencer 41 is input without inverting the signal value when the signal SCAN_EN is in an "L" level. The second latch circuit L2 sets the data input to the input terminal and stores the set data while the clock input is maintained in an "H" level. Meanwhile, the second latch circuit L2 transmits the stored data at a timing when the clock input is switched from the "H" level to the "L" level and outputs the data from the output terminal.

The fourth multiplexer M4 is a circuit that includes two input terminals and one output terminal and outputs any data input to the two input terminals from the output terminal, according to the selection control input. The two input terminals include a first input terminal connected to the output terminal of a prior-stage circuit and a second input terminal connected to the output terminal of the second latch circuit L2. The output data from the prior-stage circuit is input to the first input terminal. The output data from the output terminal of the second latch circuit L2 is input to the second input terminal. When the signal LAT_SEL is in an "H" level, the selection control input enters an "H" level regardless of the signal SCAN_SHIFT and the signal SCAN_EN. Meanwhile, when the signal LAT_SEL is in an "L" level, the selection control input enters an "H" level if the signal SCAN_SHIFT is in an "H" level and the signal SCAN_EN is in an "H" level, and enters an "L" level if at least one of the signal SCAN_SHIFT and the signal SCAN_EN is in an "L" level. Also, in the fourth multiplexer M4, the output data from the second latch circuit L2 that is input to the second input terminal is output from the output terminal when the selection control input is in an "H" level, and the output data from the prior-stage circuit that is input to the first input terminal is output from the output terminal when the selection control input is in an "L" level.

The third latch circuit L3 is a circuit that includes one input terminal, one output terminal, and one clock terminal and switches whether to transmit data input to the input terminal and output the data from the output terminal according to the clock signal input to the clock terminal. The output data from the output terminal of the fourth multiplexer M4 is input to the one input terminal. When the signal LAT_SEL is in an "L" level, the clock signal output from the sequencer 41 is input to one clock terminal without inverting the signal value regardless of the signal SCAN_EN. Meanwhile, when the signal LAT_SEL is in an "H" level, and the signal SCAN_EN is in an "H" level, the clock signal output from the sequencer 41 is input with the signal value inverted to the one clock terminal, and the clock signal output from the sequencer 41 is input without inverting the signal value when the signal SCAN_EN is in an "L" level. The third latch circuit L3 sets data input to the input terminal and stores the set data while the clock input is maintained in an "H" level. Meanwhile, the third latch circuit L3 transmits the stored data at a timing when the clock input is switched from the "H" level to the "L" level and outputs the data from the output terminal.

The fifth multiplexer M5 is a circuit that includes two input terminals and one output terminal and outputs any data input to the two input terminals from the output terminal, according to the selection control input. The two input terminals include a first input terminal connected to the ground terminal and a second input terminal connected to the output terminal of the third latch circuit L3. The first input terminal is grounded via a ground terminal and has a voltage of "zero". The output data from the output terminal of the third latch circuit L3 is input to the second input terminal. The selection control input enters an "H" level regardless of the signal SCAN_SHIFT and the signal SCAN_EN when the signal LAT_SEL is in an "L" level. Meanwhile, when the signal LAT_SEL is in an "H" level, the selection control input enters an "H" level if the signal SCAN_SHIFT is in an "H" level and the signal SCAN_EN is in an "H" level, and enters an "L" level if at least one of the signal SCAN_SHIFT and the signal SCAN_EN is in an "L" level. Also, in the fifth multiplexer M5, the output data from the third latch circuit L3 input to the second input terminal is output from the output terminal when the selection control input is in an "H" level, and the data is not output from the output terminal when the selection control input is in an "L" level.

The fourth latch circuit L4 is a circuit that includes one input terminal, one output terminal, and one clock terminal and switches whether to transmit data input to the input terminal and output the data from the output terminal according to the clock signal input to the clock terminal. The output data from the output terminal of the fifth multiplexer M5 is input to the one input terminal. When the signal LAT_SEL is in an "H" level, the clock signal output from the sequencer 41 is input to the one clock terminal without inverting the signal value regardless of the signal SCAN_EN. Meanwhile, the clock signal output from the sequencer 41 is input to the one clock terminal with the signal value inverted when the signal LAT_SEL is in an "L" level, and the signal SCAN_EN is in an "H" level, and the clock signal output from the sequencer 41 is input without inverting the signal value when the signal SCAN_EN is in an "L" level. The fourth latch circuit L4 sets data input to the input terminal and stores the set data, while the clock input is maintained in an "H" level. Meanwhile, the fourth latch circuit L4 transmits the stored data at a timing when the clock input is switched from the "H" level to the "L" level and outputs the data from the output terminal.

Next, an operation of the CRD latch group 153 according to the embodiment is described.

Figure 14A:
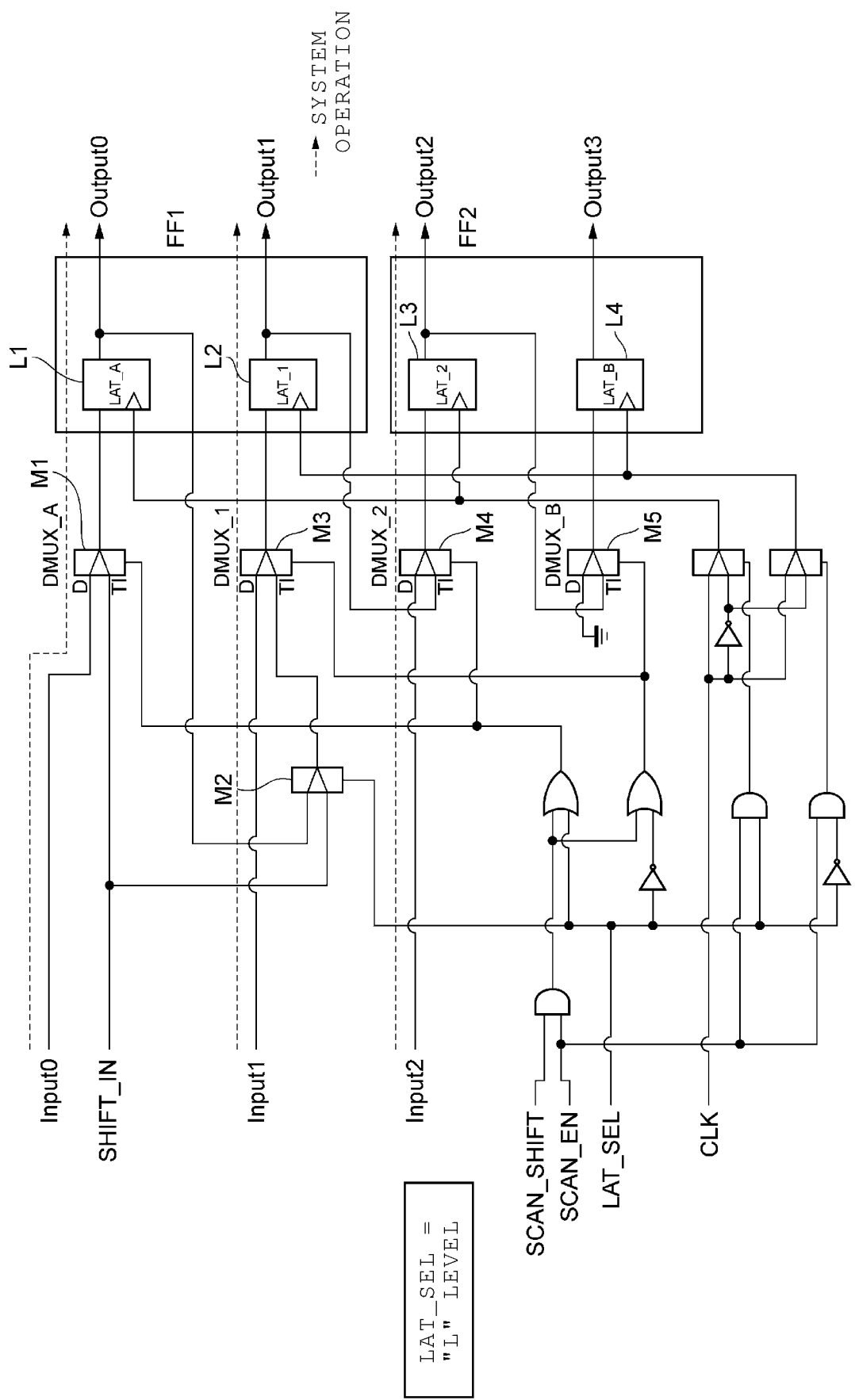
FIG. 14A is a diagram illustrating an operation of the CRD latch group when a signal LAT_SEL is in an "L" level.

First, an example of the operation of the CRD latch group 153 when the signal LAT_SEL is in an "L" level is described with reference to FIGS. 14A, 14B, 15A, and 15B. FIG. 14A illustrates an operation of a normal operation mode of the CRD latch group 153, and FIG. 14B illustrates an operation of a scan test mode of the CRD latch group 153.

As illustrated in FIG. 14A, in the normal operation mode, the CRD latch group 153 inputs signals of the prior-stage circuits from input terminals Input0, Input1, and Input2, and the signals input from the input terminals Input0, Input1, and Input2 are output to the after-stage circuits from output terminals Output0, Output1, and Output2, respectively.

Figure 14B:
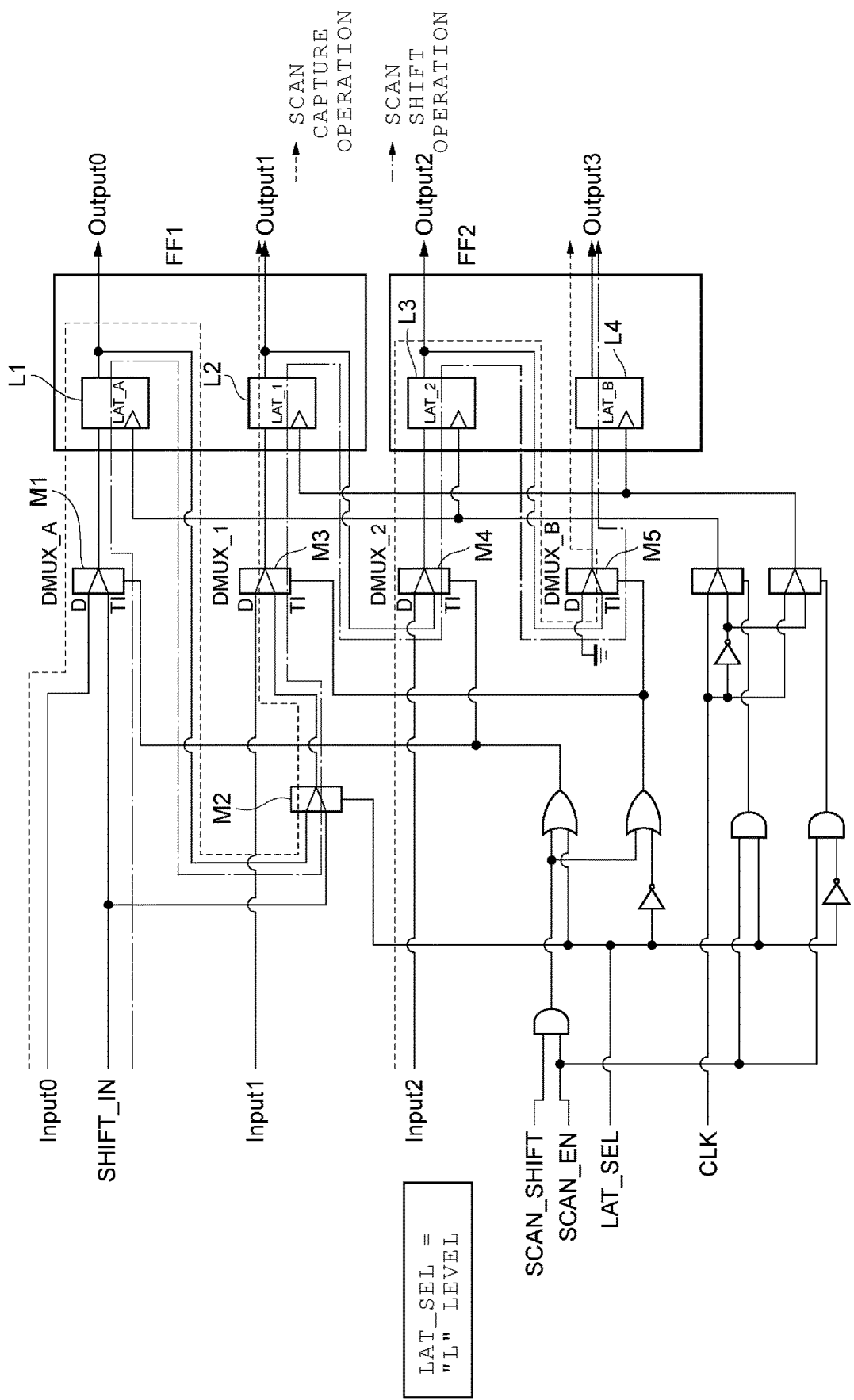
FIG. 14B is a diagram illustrating an operation of the CRD latch group when the signal LAT_SEL is in an "L" level.

As illustrated in FIG. 14B, the CRD latch group 153 inputs test data of the scan test with respect to a flip-flop circuit FF1 configured with the latch circuit L1 and the latch circuit L2 from the input terminal Input0 as the scan capturing operation in the scan test mode and inputs the test data of the scan test with respect to a flip-flop circuit FF2 configured with the latch circuit L3 and the latch circuit L4 from the input terminal Input2.

In addition, in the scan test mode, the CRD latch group 153 outputs signals for performing a shift operation to the flip-flop circuit FF1 configured with the latch circuit L1 and the latch circuit L2 from a scan-in terminal SHIFT_IN and the flip-flop circuit FF2 configured with the latch circuit L3 and the latch circuit L4, as the scan shift operation. In this case, the CRD latch group 153 performs the shift operation by the number of times in accordance with the number of flip-flops with respect to each of the flip-flop circuits FF1 and FF2 (two times in this example), so that data is read from each of the flip-flop circuits FF1 and FF2.

Also, the CRD latch group 153 is first set to the scan test mode, and the scan-in terminal SHIFT_IN inputs the test data of the scan test to the flip-flop circuit FF1 configured with the latch circuit L1 and the latch circuit L2 and the flip-flop circuit FF2 configured with the latch circuit L3 and the latch circuit L4. Next, the CRD latch group 153 is set to the normal operation mode. Next, the CRD latch group 153 operates a clock and introduces the output of the prior-stage circuit to the flip-flop circuits FF1 and FF2. Next, the CRD latch group 153 is again set to the scan test mode and outputs the data introduced to the flip-flop circuits FF1 and FF2 from the output terminal Output3 corresponding to a scan-out terminal.

In the example illustrated in FIGS. 14A and 14B, in the third multiplexer M3, since the signal LAT_SEL is in an "L" level, the selection control input enters an "H" level regardless of the signal SCAN_SHIFT and the signal SCAN_EN. In this case, the third multiplexer M3 outputs the output data input from the first latch circuit L1 to the second input terminal via the second multiplexer M2 from the output terminal. That is, the first latch circuit L1 and the second latch circuit L2 are connected to each other so that data can be normally transmitted via the third multiplexer M3 regardless of the signal SCAN_SHIFT and the signal SCAN_EN. Also, since the signal LAT_SEL is in an "L" level, the clock signal output from the sequencer 41 is input without inverting the signal value to the clock terminal of the first latch circuit L1 regardless of the signal SCAN_EN. Meanwhile, since the signal LAT_SEL is in an "L" level, and the signal SCAN_EN is in an "H" level, the clock signal output from the sequencer 41 is input with the signal value inverted to the clock terminal of the second latch circuit L2. Therefore, clock signals of which the signal values are inverted with each other are input to the first latch circuit L1 and the second latch circuit L2. That is, in this example, the first latch circuit L1 and the second latch circuit L2 are connected in series so that data can be transmitted, and clock signals having opposite phases with each other are input to the latch circuits L1 and L2, respectively. Accordingly, the first latch circuit L1 and the second latch circuit L2 configure the first flip-flop circuit FF1.

Meanwhile, in the fourth multiplexer M4, though the signal LAT_SEL is in an "L" level, and the signal SCAN_EN is in an "H" level, the signal SCAN_SHIFT repeats an "H" level and an "L" level at a predetermined cycle, and thus the selection control input repeats an "H" level and an "L" level at a predetermined cycle. That is, the second latch circuit L2 and the third latch circuit L3 are not connected to each other so that data can be normally transmitted via the fourth multiplexer M4.

In this respect, as a first control operation, the sequencer 41 transmits a control signal for maintaining the connection between an output terminal of the first latch circuit L1 and an input terminal of the second latch circuit L2 to the second multiplexer M2 and the third multiplexer M3 and also transmits a control signal for not maintaining the connection between the output terminal of the second latch circuit L2 and the input terminal of the third latch circuit L3 to the fourth multiplexer M4, to configure a flip-flop circuit with the first latch circuit L1 and the second latch circuit L2. The output terminal of the first latch circuit L1 is an example of the first data output terminal. The input terminal of the second latch circuit L2 is an example of the second data output terminal. The input terminal of the third latch circuit L3 is an example of the third data output terminal. A combination of the second multiplexer M2 and the third multiplexer M3 is an example of a first switch circuit. The fourth multiplexer M4 is an example of the second switch circuit.

Also, similarly, in the fifth multiplexer M5, since the signal LAT_SEL is in an "L" level, the selection control input enters an "H" level regardless of the signal SCAN_SHIFT and the signal SCAN_EN. In this case, in the fifth multiplexer M5, the output data input from the third latch circuit L3 to the second input terminal is output from the output terminal. That is, the third latch circuit L3 and the fourth latch circuit L4 are connected to each other so that data can be normally transmitted via the fifth multiplexer M5 regardless of the signal SCAN_SHIFT and the signal SCAN_EN. In addition, since the signal LAT_SEL is in an "L" level, the clock signal output from the sequencer 41 is input to the clock terminal of the third latch circuit L3 without Inverting the signal value regardless of the signal SCAN_SHIFT and the signal SCAN_EN. Meanwhile, since the signal LAT_SEL is in an "L" level, and the signal SCAN_EN is in an "L" level, the clock signal output from the sequencer 41 is input to the clock terminal of the fourth latch circuit L4 with the signal value inverted. That is, in this example, the third latch circuit L3 and the fourth latch circuit L4 are connected in series so that data can be normally transmitted, and clock signals having opposite phases with each other are input to the latch circuits L3 and L4, respectively. Therefore, the third latch circuit L3 and the fourth latch circuit L4 configure the second flip-flop circuit FF2.

Figure 15A:
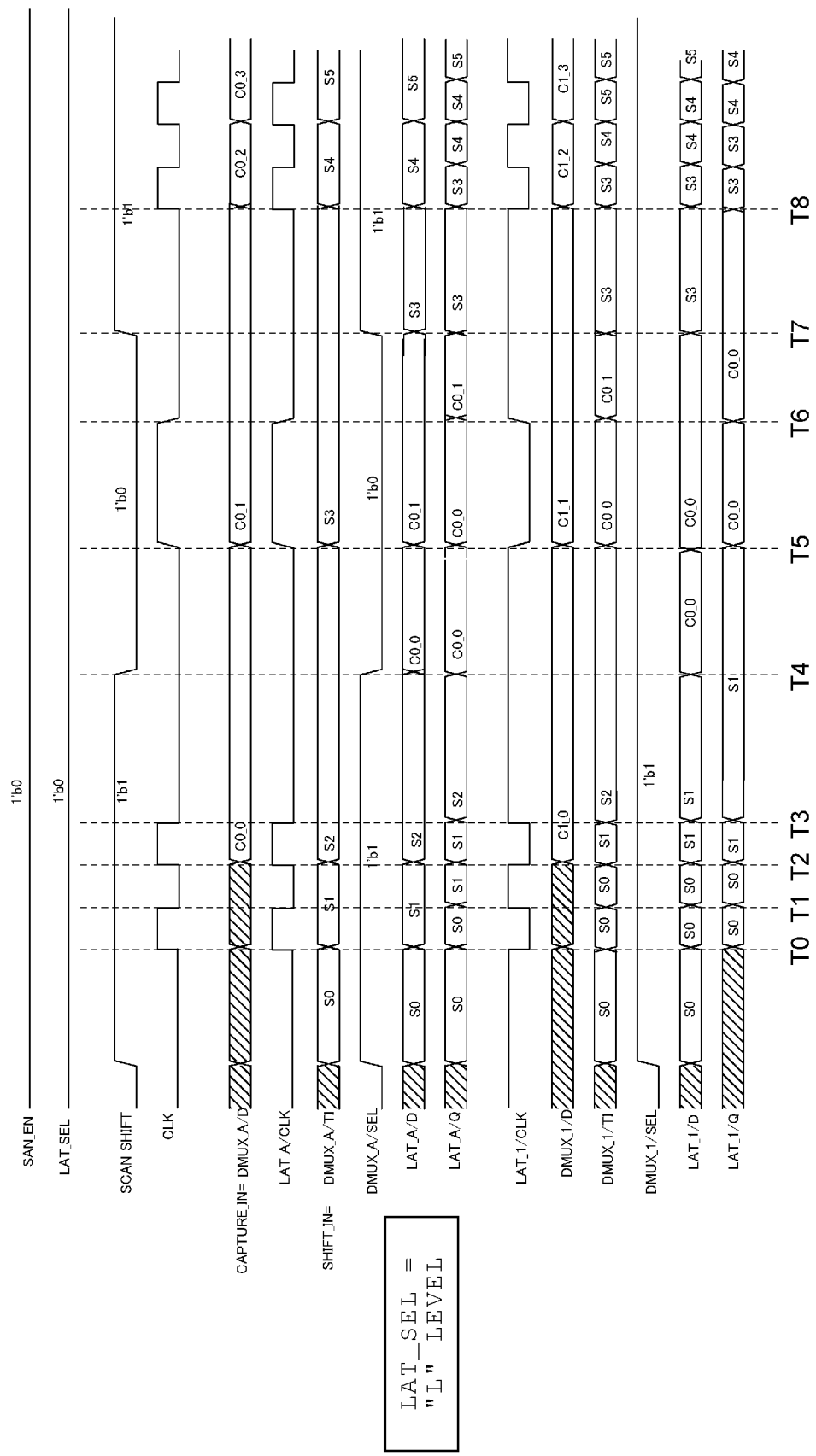
FIG. 15A is a diagram illustrating an operation of the CRD latch group when the signal LAT_SEL is in an "L" level.
Figure 15B:
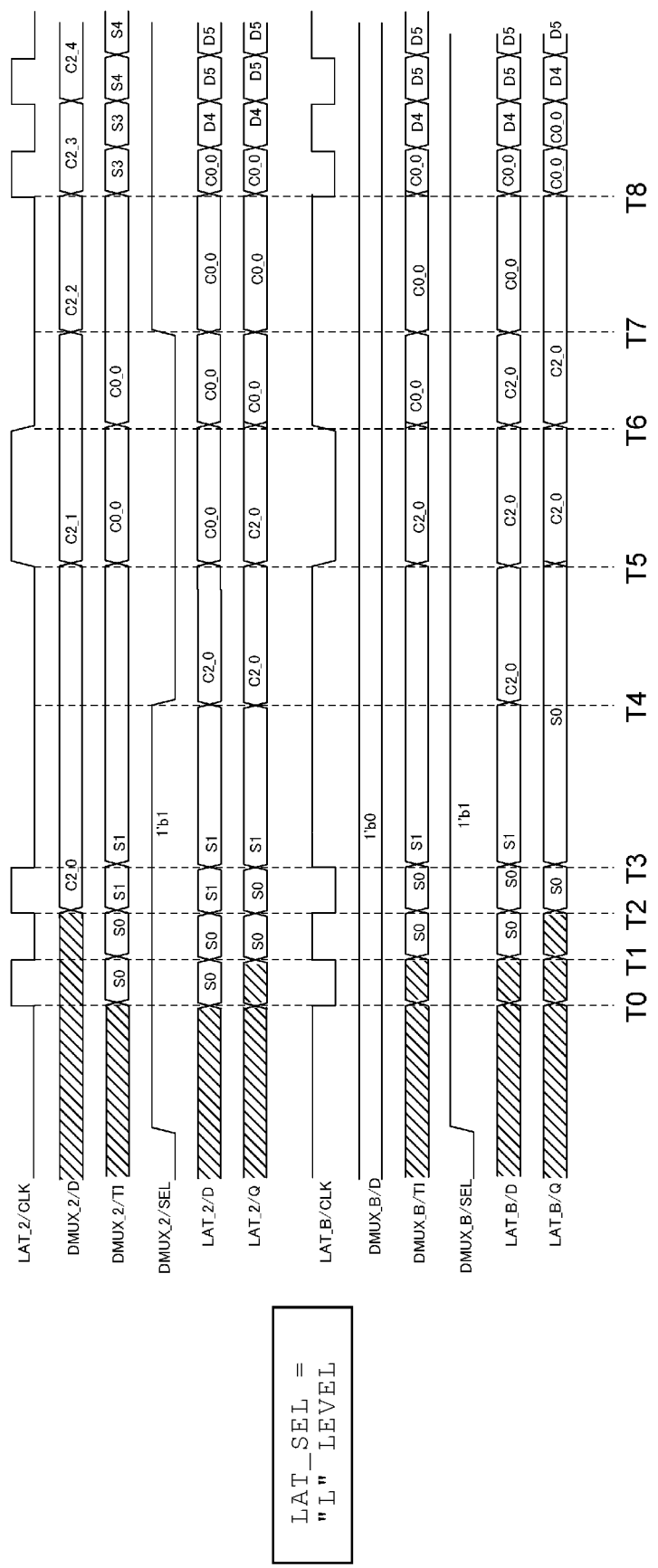
FIG. 15B is a diagram illustrating an operation of the CRD latch group when the signal LAT_SEL is in an "L" level.

As illustrated in FIGS. 15A and 15B, in this example, first, a clock signal input to the clock terminal of the first latch circuit L1 maintains in the "L" level until it reaches time T0. In this case, since the selection control input is in an "H" level, the first multiplexer M1 outputs test data S0 of the scan test provided in the signal SHIFT_IN input to the second input terminal from the output terminal and inputs the data to the input terminal of the first latch circuit L1.

Next, at the time T0, the clock signal input to the clock terminal of the first latch circuit L1 is switched from an "L" level to an "H" level. In this case, the test data of the scan test output from the output terminal of the first multiplexer M1 is switched to test data S1 and input to the input terminal of the first latch circuit L1. The first latch circuit L1 stores the test data S1 of the scan test that is input to the input terminal, while the clock signal is maintained in an "H" level.

Next, at time T1, the clock signal input to the clock terminal of the first latch circuit L1 is switched from an "H" level to an "L" level, and the test data S1 of the scan test stored in the first latch circuit L1 is output from the output terminal.

Next, at time T2, the clock signal input to the clock terminal of the first latch circuit L1 is switched from an "L" level to an "H" level. In this case, the test data of the scan test output from the output terminal of the first multiplexer M1 is switched to test data S2 and input to the input terminal of the first latch circuit L1. The first latch circuit L1 stores the test data S2 of the scan test that is input to the input terminal, while the clock signal is maintained in an "H" level.

Next, at time T3, the clock signal input to the clock terminal of the first latch circuit L1 is switched from an "H" level to an "L" level, and the test data S2 of the scan test stored in the first latch circuit L1 is output from the output terminal.

Next, at time T4, the signal SCAN_SHIFT is switched from an "H" level to an "L" level. Therefore, the selection control input of the first multiplexer M1 enters an "L" level. Also, the first multiplexer M1 outputs output data C0_0 from the prior-stage circuit input to the first input terminal from the output terminal and inputs the data to the input terminal of the first latch circuit L1. At the time T4, in the first latch circuit L1, the clock signal input to the clock terminal is switched from an "H" level to an "L" level and then is maintained in the "L" level, and thus the output data C0_0 from the prior-stage circuit that is input to the input terminal is output from the output terminal.

Next, at time T5, the clock signal input to the clock terminal of the first latch circuit L1 is switched from an "L" level to an "H" level. In this case, the first multiplexer M1 is switched to transfer output data C0_1 to the input terminal of the first latch circuit L1. The first latch circuit L1 stores the output data C0_1 from the prior-stage circuit while the clock signal is maintained in an "H" level.

Next, at time T6, the clock signal input to the clock terminal of the first latch circuit L1 is switched from an "H" level to an "L" level, and the output data C0_1 stored in the first latch circuit L1 is output from the output terminal.

Meanwhile, in the example illustrated in FIGS. 15A and 15B, in the second multiplexer M2, since the signal LAT_SEL is in an "L" level, the selection control input enters an "L" level, and the output data from the first latch circuit L1 input to the first input terminal is output from the output terminal. The test data of the scan test output from the output terminal of the second multiplexer M2 is input to the second input terminal of the third multiplexer M3.

Also, in the third multiplexer M3, since the selection control input is in an "H" level, the output data from the second multiplexer M2 that is input to the second input terminal is output from the output terminal and input to the input terminal of the second latch circuit L2.

At the time T0, in the second latch circuit L2, the clock signal input to the clock terminal is switched from an "H" level to an "L" level, output data S0 from the first latch circuit L1 via the second multiplexer M2 that is input to the input terminal is output from the output terminal.

Next, at the time T1, in the second latch circuit L2, the clock signal input to the clock terminal is switched from an "L" level to an "H" level. In this case, in the second latch circuit L2, the clock signal input to the clock terminal is switched from an "H" level to an "L" level and then is maintained in the "L" level, and thus the output data S0 from the first latch circuit L1 that is input to the input terminal is output from the output terminal.

Next, at the time T2, in the second latch circuit L2, the clock signal input to the clock terminal is switched from an "H" level to an "L" level, the output data from the first latch circuit L1 that is input to the input terminal via the second multiplexer M2 is switched to output data S1. In this case, in the second latch circuit L2, the output data S1 input to the input terminal is output from the output terminal.

Next, in the time T3, in the second latch circuit L2, the clock signal input to the clock terminal is switched from an "L" level to an "H" level. In this case, in the second latch circuit L2, while the clock signal input to the clock terminal is maintained in an "H" level, the output data S1 input to the input terminal is stored without transmitting the second latch circuit L2.

Next, at the time T4, in the second latch circuit L2, output data from the first latch circuit L1 input to the input terminal via the second multiplexer M2 is switched to the output data C0_0. In this case, in the second latch circuit L2, since the clock signal input to the clock terminal is maintained in an "H" level, the output data C0_0 from the first latch circuit L1 input to the input terminal is stored without transmission.

Next, at the time T5, in the second latch circuit L2, the clock signal input to the clock terminal is switched from an "H" level to an "L" level, and the output data C0_0 stored in the second latch circuit L2 is output from the output terminal.

In addition, at the time T1, in the fourth multiplexer M4, since the selection control input is in an "H" level, the output data S0 from the second latch circuit L2 that is input to the second input terminal is output from the output terminal and input to the input terminal of the third latch circuit L3.

Next, at the time T2, in the third latch circuit L3, the clock signal input to the clock terminal is switched from an "L" level to an "H" level. While the clock signal is maintained in an "H" level, the third latch circuit L3 stores the output data S1 from the second latch circuit L2.

Next, at the time T3, in the third latch circuit L3, the clock signal input to the clock terminal is switched from an "H" level to an "L" level. In this case, the third latch circuit L3 outputs the output data S1 from the stored second latch circuit L2 from the output terminal.

Next, at the time T4, since the selection control input enters an "L" level, the fourth multiplexer M4 outputs output data C2_0 from the prior-stage circuit that is input to the first input terminal from the output terminal and inputs the data to the input terminal of the third latch circuit L3.

At the time T4, since the clock signal input to the clock terminal is maintained in an "L" level, the third latch circuit L3 transmits the output data C2_0 from the prior-stage circuit that is input to the input terminal to output the data from the output terminal and inputs the data to the second input terminal of the fourth multiplexer M4.

Next, at the time T5, in the third latch circuit L3, the clock signal input to the clock terminal is switched from an "L" level to an "H" level, and the output data from the prior-stage circuit input to the input terminal is switched to the output data C0_0. In this case, while the clock signal input to the clock terminal is maintained in an "H" level, the third latch circuit L3 stores the output data C0_0 from the prior-stage circuit input to the input terminal.

Next, at the time T6, in the third latch circuit L3, while the clock signal input to the clock terminal is switched from an "H" level to an "L" level, the output data C0_0 from the prior-stage circuit that is stored in the third latch circuit L3 is output from the output terminal and input to the second input terminal of the fourth multiplexer M4.

Further, at the time T0, although the selection control input is in an "H" level, there is no output data from the third latch circuit L3. Therefore, the fifth multiplexer M5 does not output the output data from the output terminal.

Next, at the time T1, since the selection control input is in an "H" level, the fifth multiplexer M5 outputs the output data S0 from the third latch circuit L3 that is input to the second input terminal from the output terminal and inputs the data to the input terminal of the fourth latch circuit L4.

At the time T1, in the fourth latch circuit L4, the clock signal input to the clock terminal is switched from an "L" level to an "H" level. In this case, the fourth latch circuit L4 stores the output data S0 from the third latch circuit L3 that is input to the input terminal without transmission, while the clock signal is maintained in an "H" level.

Next, at the time T2, in the fourth latch circuit L4, the clock signal input to the clock terminal is switched from an "H" level to an "L" level. In this case, the fourth latch circuit L4 transmits the stored output data S0 from the third latch circuit L3 to output the data from the output terminal.

Next, at the time T3, in the fifth multiplexer M5, the output data from the third latch circuit L3 that is input to the second input terminal is switched to the output data S1.

At the time T3, in the fourth latch circuit L4, the clock signal input to the clock terminal is switched from an "L" level to an "H" level. In this case, the fourth latch circuit L4 stores the output data S1 from the third latch circuit L3 that is input to the input terminal without transmission, while the clock signal is maintained in an "H" level.

Next, at the time T4, in the fifth multiplexer M5, the output data from the third latch circuit L3 that is input to the second input terminal is switched to the output data C2_0.

Next, at the time T5, in the fourth latch circuit L4, the clock signal input to the clock terminal is switched from an "H" level to an "L" level. In this case, the fourth latch circuit L4 transmits the stored output data C2_0 from the third latch circuit L3 to output the data from the output terminal.

At the time T6, in the fourth latch circuit L4, since the clock signal input to the clock terminal is maintained in an "H" level, the output data C2_0 from the third latch circuit L3 that is input to the input terminal is stored without transmission.

Next, at time T7, in the fifth multiplexer M5, the output data from the third latch circuit L3 that is input to the second input terminal is switched to the output data C0_0.

At the time T7, in the fourth latch circuit L4, the clock signal input to the clock terminal is maintained in an "H" level, and the output data C0_0 from the third latch circuit L3 that is input to the input terminal is stored without transmission.

Next, at the time T8, since the clock signal input to the clock terminal is switched from an "H" level to an "L" level, the fourth latch circuit L4 transmits the output data C0_0 from the third latch circuit L3 that is stored in the fourth latch circuit L4 to output the data from the output terminal. That is, the fourth latch circuit L4 outputs the output data C2_0 and output data 0_0 from the output terminal as continuous output data from the prior-stage circuit.

Figure 16:
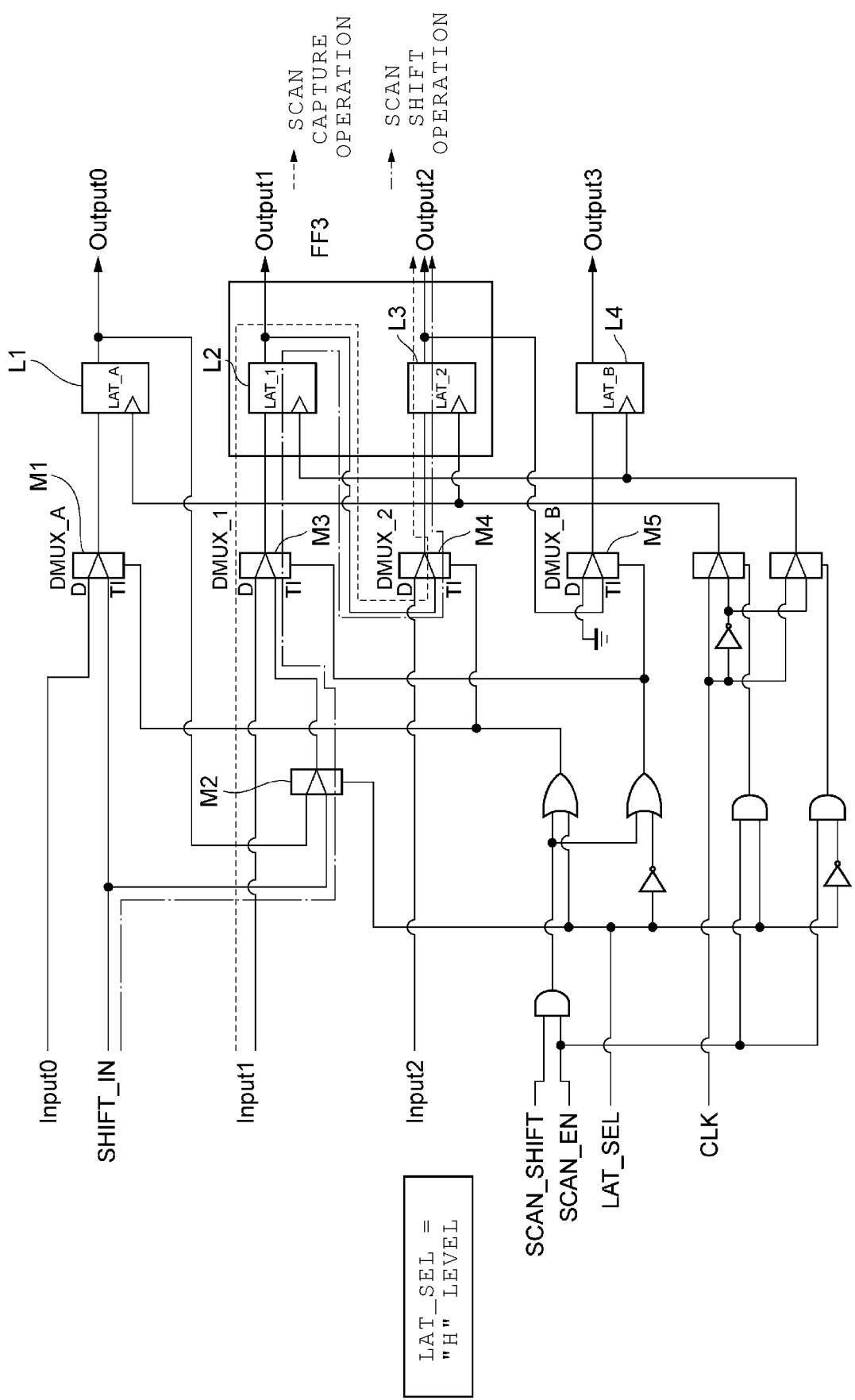
FIG. 16 is a diagram illustrating an operation of the CRD latch group when the signal LAT_SEL is in an "H" level.
Figure 17A:
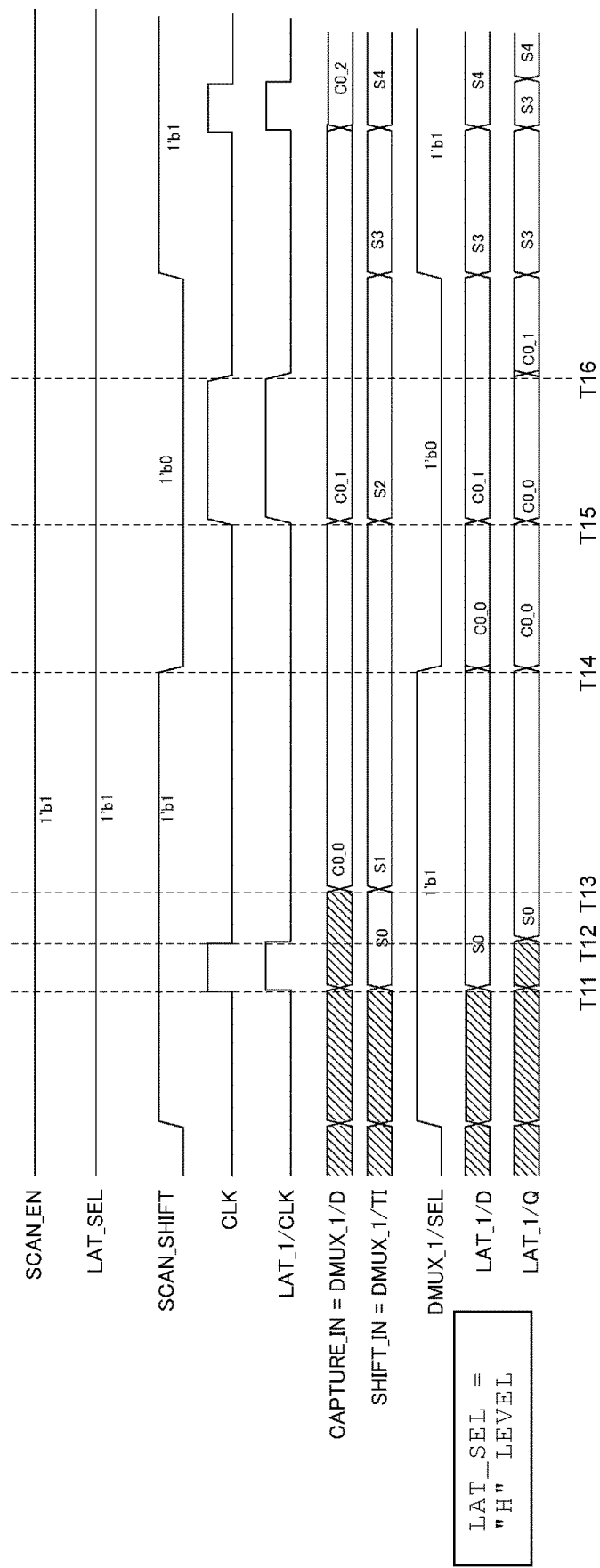
FIG. 17A is a diagram illustrating an operation of the CRD latch group when the signal LAT_SEL is in an "H" level.

Next, with reference to FIGS. 16, 17A, and 17B, an operation of the CRD latch group 153 when the signal LAT_SEL is in an "H" level is described. FIG. 16 indicates an operation of a scan test mode of the CRD latch group 153.

As illustrated in FIG. 16, in the scan test mode, the CRD latch group 153 inputs the test data of the scan test to a flip-flop circuit FF3 configured with the latch circuit L2 and the latch circuit L3 from an input terminal Input1, as the scan capturing operation.

In addition, as the scan shift operation, in the scan test mode, the CRD latch group 153 outputs a signal for performing a shift operation with respect to the flip-flop circuit FF3 configured with the latch circuit L2 and the latch circuit L3 from the scan-in terminal SHIFT_IN. In this case, the CRD latch group 153 performs the shift operation by the number of times in accordance with the number of flip-flops with respect to the flip-flop circuit FF3 (once in this example), to read the data from the flip-flop circuit FF3.

Also, the CRD latch group 153 is first set to the scan test mode, and the scan-in terminal SHIFT_IN inputs the test data of the scan test to the flip-flop circuit FF3 configured with the latch circuit L2 and the latch circuit L3. Next, the CRD latch group 153 is set to the normal operation mode. Next, the CRD latch group 153 operates a clock and introduces the output of the prior-stage circuit to the flip-flop circuit FF3. Next, the CRD latch group 153 is again set to the scan test mode and outputs the data introduced to the flip-flop circuit FF3 from the output terminal Output2 corresponding to a scan-out terminal.

In the example illustrated in FIG. 16, since the signal LAT_SEL is in an "H" level, the fourth multiplexer M4 enters an "H" level regardless of the signal SCAN_SHIFT and the signal SCAN_EN. In this case, the fourth multiplexer M4 outputs, from the output terminal, the output data that is input from the second latch circuit L2 to the second input terminal, input the output data to the input terminal of the third latch circuit L3. That is, the second latch circuit L2 and the third latch circuit L3 are connected to each other so that data can be transmitted via the fourth multiplexer M4 regardless of the signal SCAN_SHIFT and the signal SCAN_EN. In addition, since the signal LAT_SEL is in an "H" level, the clock signal output from the sequencer 41 is input to the clock terminal of the second latch circuit L2 with the signal value inverted regardless of the signal SCAN_EN.

Since the signal LAT_SEL is in an "H" level, and the signal SCAN_EN is in an "H" level, the clock signal output from the sequencer 41 is input to the clock terminal of the third latch circuit L3 without inverting the signal value. That is, in this example, the second latch circuit L2 and the third latch circuit L3 are connected in series so that data can be transmitted, and clock signals having opposite phases with each other are input to the latch circuits L2 and L3, respectively. Therefore, the second latch circuit L2 and the third latch circuit L3 configure the third flip-flop circuit FF3.

Meanwhile, in the third multiplexer M3, though the signal LAT_SEL is in an "H" level, and the signal SCAN_EN is in an "H" level, the signal SCAN_SHIFT repeats an "H" level and an "L" level at a predetermined cycle, and thus the selection control input repeats an "H" level and an "L" level at a predetermined cycle. That is, the first latch circuit L1 and the second latch circuit L2 are not connected to each other so that data can be normally transmitted via the third multiplexer M3. Similarly, in the fifth multiplexer M5, though the signal LAT_SEL is in an "H" level, and the signal SCAN_EN is in an "H" level, the signal SCAN_SHIFT repeats an "H" level and an "L" level at a predetermined cycle, and thus the selection control input repeats an "H" level and an "L" level at a predetermined cycle. That is, the third latch circuit L3 and the fourth latch circuit L4 are not connected to each other so that data can be normally transmitted via the fifth multiplexer M5.

In this respect, as a second control operation, the sequencer 41 transmits a control signal for not maintaining the connection between an output terminal of the second latch circuit L2 and an input terminal of the third latch circuit L3 to the third multiplexer M3 and the fifth multiplexer M5 and also transmits a control signal for maintaining the connection between the output terminal of the second latch circuit L2 and the input terminal of the third latch circuit L3 to the fourth multiplexer M4, to configure a flip-flop circuit with the second latch circuit L2 and the third latch circuit L3.

Also, the sequencer 41 performs alternately the first control operation and the second control operation described above. In addition, the sequencer 41 transmits a control signal to the first multiplexer M1 and the second multiplexer M2, connects any one of the output terminal of the first latch circuit L1 and the output terminal of the prior-stage circuit to the input terminal of the second latch circuit L2, transmits the control signal to the third multiplexer M3, and connects any one of the output terminal of the second latch circuit L2 and the output terminal of the prior-stage circuit to the input terminal of the third latch circuit L3.

As illustrated in FIGS. 17A and 17B, in this example, in the second multiplexer M2, since the signal LAT_SEL is in an "H" level, the selection control input is in an "H" level, and the test data of the scan test input to the second input terminal is output from the output terminal.

At time T11, in the third multiplexer M3, since the selection control input is in an "H" level, the test data S0 of the scan test that is input to the second input terminal via the second multiplexer M2 is output from the output terminal and is input to the input terminal of the second latch circuit L2.

At the time T11, in the second latch circuit L2, the clock signal input to the clock terminal is switched from an "L" level to an "H" level. In this case, in the second latch circuit L2, while the clock signal is maintained in an "H" level, the test data S0 of the scan test input to the input terminal is stored without transmission.

Next, at time T12, in the second latch circuit L2, the clock signal input to the clock terminal is switched from an "H" level to an "L" level, and the test data S0 of the scan test stored in the second latch circuit L2 is output from the output terminal.

Next, at time T13, in the third multiplexer M3, the output data C0_0 from the first latch circuit L1 to the first input terminal via the second multiplexer is output. In addition, at the time T13, in the third multiplexer M3, the test data of the scan test is switched to the test data S1.

At the time T13, in the second latch circuit L2, the clock signal input to the clock terminal is in an "L" level. In this case, in the second latch circuit L2, since the clock signal input to the clock terminal is maintained in an "L" level, output data C1_0 from the prior-stage circuit that is input to the input terminal is transmitted to output the data from the output terminal and input to the input terminal of the third latch circuit L3.

Next, at time T14, since the signal SCAN_SHIFT is in an "L" level, the selection control input of the second multiplexer M2 enters an "L" level, and the output data C0_0 from the prior-stage circuit that is input to the first input terminal is output from the output terminal and is input to the input terminal of the third latch circuit L3.

At the time T14, since the clock signal input to the clock terminal is maintained in an "L" level, the second latch circuit L2 outputs the output data C0_0 from the prior-stage circuit input to the input terminal from the output terminal.

Next, at time T15, the output data from the first latch circuit L1 that is input to the first input terminal of the third multiplexer M3 is switched to the output data C0_1, and the test data of the scan test input to the second input terminal of the third multiplexer M3 is switched to the test data S2. Also, at the time T15, in the third multiplexer M3, since the selection control input is in an "L" level, the output data C0_1 from the first latch circuit L1 that is input to the first input terminal is output from the output terminal and is input to the input terminal of the second latch circuit L2.

At the time T15, in the second latch circuit L2, the clock signal input to the clock terminal is switched from an "L" level to an "H" level. In this case, in the second latch circuit L2, while the clock signal is maintained in an "H" level, the output data C0_1 from the first latch circuit L1 that is input to the input terminal is stored without transmission.

Next, at time T16, in the second latch circuit L2, while the clock signal input to the clock terminal is switched from an "H" level to an "L" level, the output data C0_1 from the first latch circuit L1 that is stored in the second latch circuit L2 is output to the output terminal.

Meanwhile, in the fourth multiplexer M4, since the selection control input is in an "H" level, the output data C0_1 from the second latch circuit L2 that is input to the second input terminal is output from the output terminal and is input to the input terminal of the third latch circuit L3.

Next, at the time T11, in the third latch circuit L3, the clock signal input to the clock terminal is switched from an "H" level to an "L" level. In this case, in the fourth multiplexer M4, though the selection control input is in an "H" level, since there is no output data of the second latch circuit L2 in the second input terminal of the fourth multiplexer M4, the data is not input to the input terminal of the third latch circuit L3.

Next, at the time T12, in the third latch circuit L3, the clock signal input to the clock terminal is switched from an "L" level to an "H" level. At the time T12, the output data S0 of the second latch circuit L2 is input to the second input terminal of the fourth multiplexer M4. In this case, in the third latch circuit L3, while the clock signal is maintained in an "H" level, the output data S0 of the second latch circuit L2 that is input to the input terminal is stored without transmission.

Next, at the time T14, the output data of the second latch circuit L2 that is input to the second input terminal of the fourth multiplexer M4 is switched to the output data C0_0. In this case, at the time T14, in the third latch circuit L3, since the clock signal input to the clock terminal is maintained in an "H" level, the output data C0_0 of the second latch circuit L2 that is input to the input terminal is stored without transmission.

Next, at the time T15, in the third latch circuit L3, the clock signal input to the clock terminal is switched from an "H" level to an "L" level. In this case, the third latch circuit L3 outputs the stored output data C0_0 of the second latch circuit L2 from the output terminal.

In this manner, according to the present embodiment, the second latch circuit L2 and the third latch circuit L3 are latch circuits that are originally mounted, and the first latch circuit L1 and the fourth latch circuit L4 are latch circuits that are newly added and mounted. In this example, a first flip-flop circuit includes a combination of the first latch circuit L1 and the second latch circuit L2 by adding the first latch circuit L1, and a second flip-flop circuit is configured with a combination of the third latch circuit L3 and the fourth latch circuit L4 by adding the fourth latch circuit L4. In addition, also in the latch circuits that are originally mounted, a third flip-flop circuit is configured with a combination of the second latch circuit L2 and the third latch circuit L3. Generally, since the latch circuit has a smaller mounting area than a flip-flop circuit, the mounting area is more reduced than in a case where a flip-flop circuit is newly added and mounted. In addition, unlike the latch circuit, since the flip-flop circuit can apply the scan test, a CRD latch that stores an address corresponding to a defective column can be identified in advance by the failure detection of the CRD latch group 153.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor device comprising:
   a first latch circuit that includes a first clock input terminal to which a first clock signal is input during operation of the semiconductor device, a first data input terminal, and a first data output terminal;
   a second latch circuit that includes a second clock input terminal to which a second clock signal obtained by inverting the first clock signal is input during operation of the semiconductor device, a second data input terminal, and a second data output terminal;
   a third latch circuit that includes a third clock input terminal to which the first clock signal is input during operation of the semiconductor device, a third data input terminal, and a third data output terminal;
   a first switch circuit configured to connect or disconnect an electrical path between the first data output terminal and the second data input terminal;
   a second switch circuit configured to connect or disconnect an electrical path between the second data output terminal and the third data input terminal; and
   a control circuit configured to operate the semiconductor device in a normal mode, and first and second test modes, wherein
   the control circuit, while operating the semiconductor device in the first test mode, transmits a control signal to the first switch circuit to connect the electrical path between the first data output terminal and the second data input terminal, and
   the control circuit, while operating the semiconductor device in the second test mode, transmits a control signal to the second switch circuit to connect the electrical path between the second data output terminal and the third data input terminal.

2. The semiconductor device according to claim 1, wherein
   the control circuit, while operating the semiconductor device in the first test mode, transmits a control signal to the second switch circuit to disconnect the electrical path between the second data output terminal and the third data input terminal.

3. The semiconductor device according to claim 1, wherein
   the control circuit, while operating the semiconductor device in the second test mode, transmits a control signal to the first switch circuit to disconnect the electrical path between the first data output terminal and the second data input terminal.

4. The semiconductor device according to claim 1, wherein
   the control circuit is configured to operate the semiconductor device alternately in the first and second test modes when performing a scan test.

5. The semiconductor device according to claim 1, wherein
   the first switch circuit connects an electrical path between one of the first data output terminal and a first circuit terminal of a prior-stage circuit and the second data input terminal based on a control signal from the control circuit, and
   the second switch circuit connects an electrical path between one of the second data output terminal and a second circuit terminal of the prior-stage circuit and the third data input terminal based on a control signal from the control circuit.

6. The semiconductor device according to claim 5, wherein each of the first test mode and the second test mode is a mode for performing a scan test.

7. The semiconductor device according to claim 6, wherein
   the prior-stage circuit outputs data during the normal mode, and undergoes a test for failure in the first and second test modes.

8. The semiconductor device according to claim 7, wherein, during the scan test:
   the first data input terminal of the first latch circuit is connected to a first external terminal for inputting test data used for detecting a failure of the first latch circuit, the second latch circuit, or the third latch circuit, and
   the third data output terminal of the third latch circuit is connected to a second external terminal from which the test data that were input from the first external terminal to the first data input terminal is output to the second external terminal via the first latch circuit, the second latch circuit, and the third latch circuit.

9. The semiconductor device according to claim 8, wherein
the first data input terminal of the first latch circuit is connected to an output terminal of the prior-stage circuit in the normal mode, and
the third data output terminal of the third latch circuit outputs output data from the prior-stage circuit that were input through the first data input terminal via the first latch circuit, the second latch circuit, and the third latch circuit.

10. The semiconductor device according to claim 1, further comprising:
a command register for storing a command;
an address register for storing an address; and
a data register for storing data, wherein
the first, second, and third latch circuits are parts of one of the command, address, and data registers.

11. A semiconductor storage device comprising:
a nonvolatile memory;
a control circuit; and
a register circuit for storing information related to the nonvolatile memory, the register circuit including:
a first latch circuit that includes a first clock input terminal to which a first clock signal is input during operation of the register circuit, a first data input terminal, and a first data output terminal;
a second latch circuit that includes a second clock input terminal to which a second clock signal obtained by inverting the first clock signal is input during operation of the register circuit, a second data input terminal, and a second data output terminal;
a third latch circuit that includes a third clock input terminal to which the first clock signal is input during operation of the register circuit, a third data input terminal, and a third data output terminal;
a first switch circuit configured to connect or disconnect an electrical path between the first data output terminal and the second data input terminal; and
a second switch circuit configured to connect or disconnect an electrical path between the second data output terminal and the third data input terminal, wherein
the control circuit is configured to operate the register circuit in a normal mode, and first and second test modes, and while operating the register circuit in the first test mode, transmits a control signal to the first switch circuit to connect the electrical path between the first data output terminal and the second data input terminal, and while operating the register circuit in the second test mode, transmits a control signal to the second switch circuit to connect the electrical path between the second data output terminal and the third data input terminal.

12. The semiconductor storage device according to claim 11, further comprising:
a first chip in which the control circuit and the register circuit are provided; and
a second chip to which the first chip is bonded and in which the nonvolatile memory is provided.

13. The semiconductor storage device according to claim 11, wherein
the control circuit, while operating the register circuit in the first test mode, transmits a control signal to the second switch circuit to disconnect the electrical path between the second data output terminal and the third data input terminal.

14. The semiconductor storage device according to claim 11, wherein
the control circuit, while operating the register circuit in the second test mode, transmits a control signal to the first switch circuit to disconnect the electrical path between the first data output terminal and the second data input terminal.

15. The semiconductor storage device according to claim 11, wherein
the control circuit is configured to operate the register circuit alternately in the first and second test modes when performing a scan test.

16. The semiconductor storage device according to claim 11, wherein
the first switch circuit connects an electrical path between one of the first data output terminal and a first circuit terminal of a prior-stage circuit and the second data input terminal based on a control signal from the control circuit, and
the second switch circuit connects an electrical path between one of the second data output terminal and a second circuit terminal of the prior-stage circuit and the third data input terminal based on a control signal from the control circuit.

17. The semiconductor storage device according to claim 16, wherein each of the first test mode and the second test mode is a mode for performing a scan test.

18. The semiconductor storage device according to claim 17, wherein
the prior-stage circuit outputs data during the normal mode, and undergoes a test for failure in the first and second test modes.

19. The semiconductor storage device according to claim 18, wherein, during the scan test:
the first data input terminal of the first latch circuit is connected to a first external terminal for inputting test data used for detecting a failure of the first latch circuit, the second latch circuit, or the third latch circuit, and
the third data output terminal of the third latch circuit is connected to a second external terminal from which the test data that were input from the first external terminal to the first data input terminal is output to the second external terminal via the first latch circuit, the second latch circuit, and the third latch circuit.

20. The semiconductor storage device according to claim 19, wherein
the first data input terminal of the first latch circuit is connected to an output terminal of the prior-stage circuit in the normal mode, and
the third data output terminal of the third latch circuit outputs output data from the prior-stage circuit that were input through the first data input terminal via the first latch circuit, the second latch circuit, and the third latch circuit.

* * * * *